United States Patent
Brandvold

(10) Patent No.: US 11,005,245 B2
(45) Date of Patent: May 11, 2021

(54) CABLE SUPPORT BRACKET

(71) Applicant: Richard Martin Brandvold, Whitehorse (CA)

(72) Inventor: Richard Martin Brandvold, Whitehorse (CA)

(*) Notice: Subject to any disclaimer, the term of this patent is extended or adjusted under 35 U.S.C. 154(b) by 0 days.

(21) Appl. No.: 16/635,120

(22) PCT Filed: Aug. 16, 2018

(86) PCT No.: PCT/CA2018/050992
§ 371 (c)(1),
(2) Date: Jan. 29, 2020

(87) PCT Pub. No.: WO2019/041025
PCT Pub. Date: Mar. 7, 2019

(65) Prior Publication Data
US 2020/0244054 A1 Jul. 30, 2020

Related U.S. Application Data

(60) Provisional application No. 62/552,023, filed on Aug. 30, 2017.

(51) Int. Cl.
*H02G 3/04* (2006.01)

(52) U.S. Cl.
CPC ................... *H02G 3/0456* (2013.01)

(58) Field of Classification Search
CPC ............... F16L 3/223; F16L 3/22; H02G 3/32
(Continued)

(56) References Cited

U.S. PATENT DOCUMENTS

| 4,566,660 A * | 1/1986 | Anscher ............... F16L 3/13 24/453 |
| 4,917,340 A * | 4/1990 | Juemann ............. F16L 3/13 248/74.2 |

(Continued)

FOREIGN PATENT DOCUMENTS

| JP | 2005133826 | 5/2005 |
| JP | 2007143333 | 6/2007 |

(Continued)

OTHER PUBLICATIONS

IML Group PLC., "Fast-fit cable clamps make for superior and faster installation", downloaded on Jan. 24, 2020 from http://www.eponthenet.net/article/44343/Fast-fit-cable-clamps-make-for-superior-and-faster-installation.aspx, product known to be available at least as early as Aug. 11, 2017.

(Continued)

*Primary Examiner* — Bradley Duckworth
(74) *Attorney, Agent, or Firm* — ATMAC Patent Services Ltd.; Andrew T. MacMillan

(57) ABSTRACT

A cable bracket includes a base, first and second plates extending from a first side of the base, and an arm extending diagonally from an upper end connected to the first plate at a position away from the base. The arm extends to a lower end positioned toward the base intermediate the first plate and the second plate, and the lower end of the arm is not secured to the base. The arm is of made of a semi-rigid material such that the arm can be deflected from a neutral position by a user in order to insert a cable between the arm and the second plate. A dual-sided bracket may be formed by including one or more plates and arms on both sides of the base. A dovetail connection may allow multiple cable brackets to be coupled in series. Two brackets may also be coupled utilizing an intermediate slider.

20 Claims, 19 Drawing Sheets

(58) Field of Classification Search
USPC ................................................ 248/68.1, 74.2
See application file for complete search history.

(56) References Cited

U.S. PATENT DOCUMENTS

| | | | | |
|---|---|---|---|---|
| D326,999 | S * | 6/1992 | Johnson | D8/356 |
| 5,188,318 | A | 2/1993 | Newcomer et al. | |
| 5,765,786 | A | 6/1998 | Gretz | |
| 5,825,961 | A * | 10/1998 | Wilkins | G02B 6/4446 |
| | | | | 385/135 |
| 6,216,986 | B1 * | 4/2001 | Kwilosz | F16L 3/13 |
| | | | | 248/73 |
| 6,779,763 | B2 * | 8/2004 | Miura | F16L 3/13 |
| | | | | 248/68.1 |
| 7,051,983 | B2 * | 5/2006 | Sirignano | H02G 3/32 |
| | | | | 248/68.1 |
| 7,316,374 | B2 | 1/2008 | Maruyama | |
| 7,326,855 | B2 | 2/2008 | Moffatt | |
| 7,802,761 | B2 | 9/2010 | Volchko | |
| 7,915,542 | B2 | 3/2011 | Forbis | |
| 8,240,619 | B2 * | 8/2012 | Nikayin | H02G 3/30 |
| | | | | 248/68.1 |
| 8,950,712 | B2 * | 2/2015 | Lares | F16L 3/123 |
| | | | | 248/68.1 |
| 9,133,964 | B2 * | 9/2015 | Hirama | F16L 55/035 |
| 9,453,593 | B2 * | 9/2016 | Pearson | F16L 3/12 |
| 10,527,202 | B2 * | 1/2020 | Kanie | F16L 3/13 |
| 2005/0045775 | A1 * | 3/2005 | Kato | F16L 55/035 |
| | | | | 248/68.1 |
| 2005/0095082 | A1 | 5/2005 | Maruyama | |
| 2009/0014209 | A1 * | 1/2009 | Forbis | H02G 3/32 |
| | | | | 174/480 |
| 2009/0166489 | A1 | 7/2009 | Volchko | |
| 2015/0377387 | A1 * | 12/2015 | Meyers | B60R 16/0215 |
| | | | | 248/74.2 |
| 2017/0219126 | A1 * | 8/2017 | Kato | B60R 16/08 |

FOREIGN PATENT DOCUMENTS

| | | |
|---|---|---|
| JP | 2012228042 | 11/2012 |
| KR | 200152037 | 7/1999 |
| KR | 200256912 | 12/2000 |

OTHER PUBLICATIONS

WIPO, "International Search Report" dated Nov. 15, 2018 in counterpart application PCT/CA2018/050992.
WIPO, "Written opinion of the international searching authority" dated Nov. 15, 2018 in counterpart application PCT/CA2018/050992.
Iberville, "A complete protector plate family to meet the requirements of CEC Rule 12-516", copyright 2013.
Canadian Intellectual Property Office (CIPO), Office action dated Feb. 26, 2021 in counterpart application CA 3,071,463.

* cited by examiner

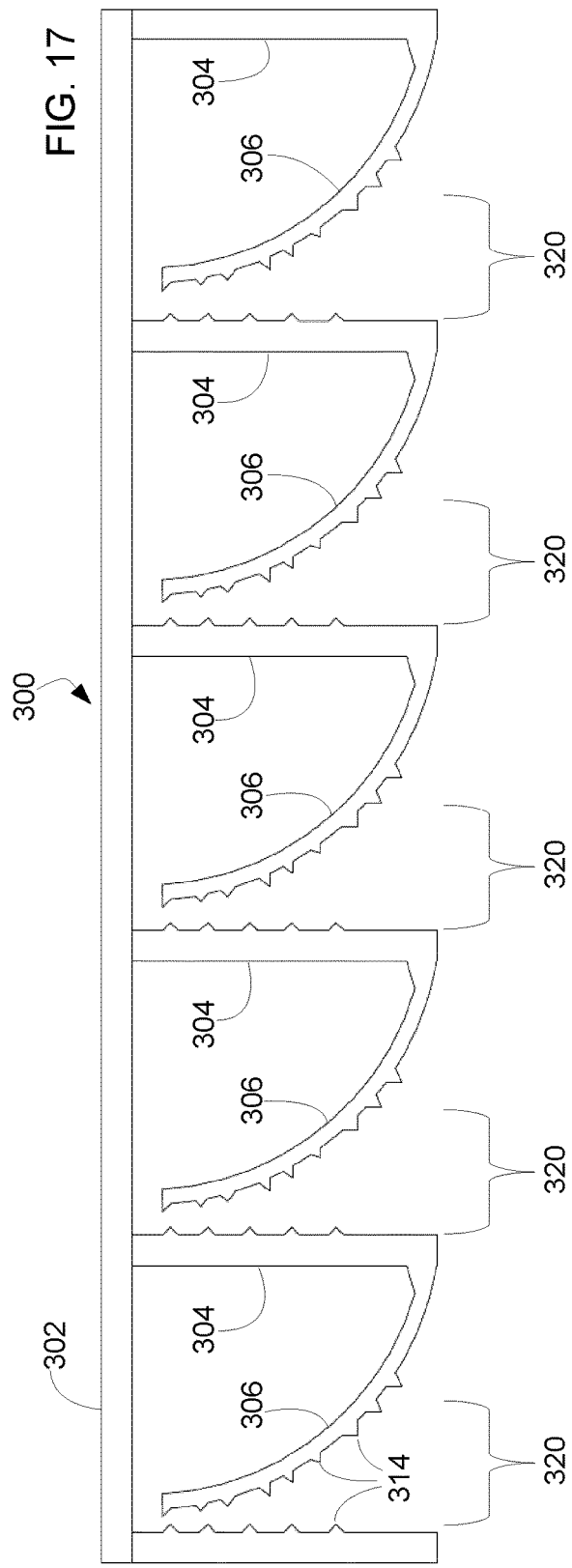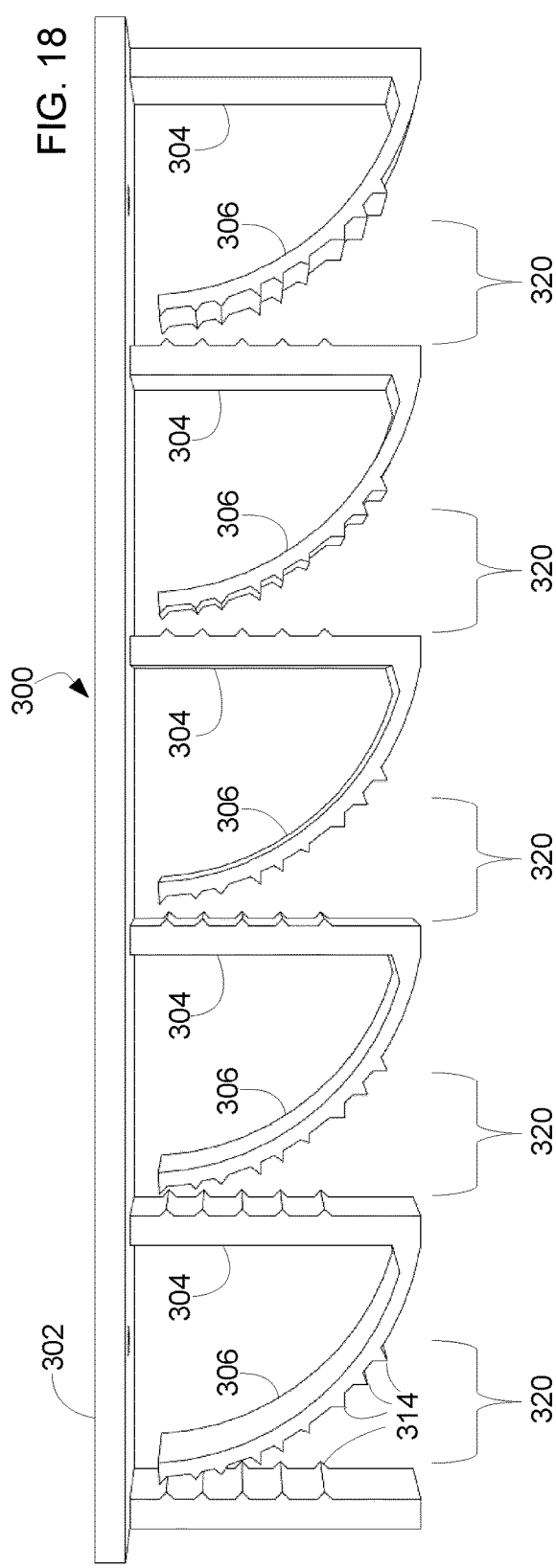

CABLE SUPPORT BRACKET

CROSS-REFERENCE TO RELATED APPLICATIONS

This application claims the benefit of priority of U.S. Provisional Application No. 62/552,023 filed Aug. 30, 2017, which is incorporated herein by reference.

BACKGROUND OF THE INVENTION

(1) Field of the Invention

The invention pertains to a cable support bracket. More specifically, the invention relates to a support bracket for securing electrical wires and cables of different sizes against framing members during building construction and renovation.

(2) Description of the Related Art

It is difficult to install multiple electrical cables within a stud space in a timely fashion while meeting the rules of the Canadian Electric Code (CEC). The CEC currently requires cables to be installed 32 mm from the face of framing members such as studs and joists when passing through the framing members. In the Yukon, there is a proposal to amend the rules to require 32 mm spacing from the edge of framing members when cables are run along the members such as while cables are stapled up a stud. A problem created by these requirements is that no more than two cables may be attached to a typical two-by-four inch stud. In today's increasingly electrified buildings, there is simply not enough space on the side of the stud to attach all the wires that typically need to be run in a given stud space. For example, if twelve wires need to be run along one stud, these twelve wires cannot simply be stapled to the face of the stud while still meeting code.

Usually this problem is solved by installing wooden blocking between framing members and then attaching the cables to the blocking with cable staples. A drawback to this method is the significant time involved to prepare and install the blocking. One must find suitable blocking material on-site, cut the material to the spacing of the studs and then install the blocking with nails or screws such that the blocking is flush with the edges of the studs. The cables then need to be attached to the blocking with staples while making sure the cables remain spaced 32 mm from the edge of the stud. The more cables to install, the longer the process takes. Changes to cabling or correction of mistakes is equally time consuming. Furthermore, in a floor with eight-foot ceilings, a minimum of two wooden cable blocks need to be installed to ensure that the cables are supported at least once every 1.5 m span length.

Attempts have been made to develop clips and brackets for securing cables against building framing members. Examples include:
U.S. Pat. No. 5,188,318, "Stud engaging electrical wiring clip", patented Feb. 23, 1993.
U.S. Pat. No. 5,765,786, "Cable support", patented Jun. 16, 1998.
U.S. Pat. No. 7,326,855, "Device for stacking wires or cables", patented Feb. 5, 2008.
U.S. Pat. No. 7,915,542, "Electrical cable support bracket", patented Mar. 29, 2011.
However, each of the above designs suffer from a similar problem in that the brackets and clips are manufactured to hold one or more specific shapes and sizes of cable. However, different building wiring projects have different cabling requirements. Even if a single cable support bracket is manufactured to include a plurality of differently sized and shaped cable restraining areas and thereby support multiple different cable shapes and sizes, it is highly unlikely that the predetermined cable shape/size selections and numbers thereof on the bracket will be suitable for all wiring projects. For instance, a bracket having five separate restraining areas for supporting up to five cables of a first size/shape will be non-ideal in wiring projects where eight cables of the first size/shape need to be run. The fact that the bracket may also have three additional restraining areas for supporting cables of a second size/shape provides no benefit when cables of the second cable shape/size are not required in the current wiring project.

BRIEF SUMMARY OF THE INVENTION

According to an exemplary embodiment of the invention there is disclosed a cable bracket including a base, a first plate extending from a first side of the base, and a second plate extending from the first side the base, the second plate being adjacent to the first plate. An arm extends diagonally from an upper end connected to the first plate at a position on the first plate away from the base. The arm extends from the upper end to a lower end positioned toward the base intermediate the first plate and the second plate. The lower end of the arm is not secured to the base, and the arm is of made of a semi-rigid material such that the arm is capable of being deflected from a neutral position by a user in order to insert a cable between the arm and the second plate.

In an advantageous embodiment, a cable bracket includes a plurality of cable securing areas formed by semi-rigid arms curved toward adjacent plates. Each of the cable securing areas beneficially can secure a range of differently sized and shaped cables thereby increasing the flexibility of the cable bracket. A same model of the cable bracket may beneficially be utilized to secure different cables on different building projects thereby increasing user convenience and efficiency.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof:

FIG. 17 shows a top view of the single-sided cable bracket of FIG. 16.

FIG. 18 shows a projection top view of the single-sided cable bracket of FIG. 16.

DETAILED DESCRIPTION

Figure 1:
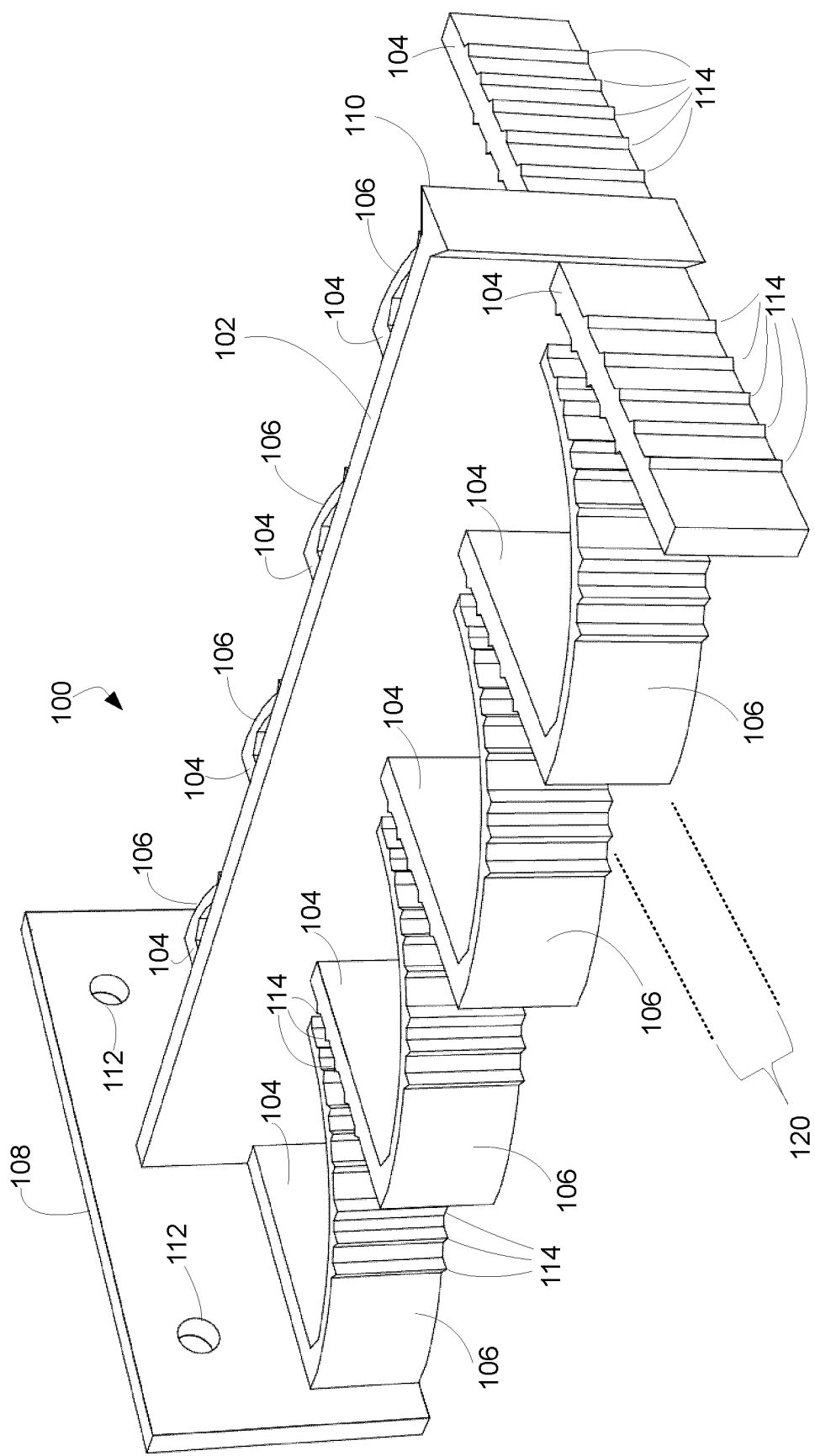
FIG. 1 shows a perspective view of a dual-sided cable bracket for supporting a plurality of electrical cables according to an exemplary embodiment.

FIG. 1 shows a perspective view of a dual-sided cable bracket 100 for supporting a plurality of electrical cables according to an exemplary embodiment. The cable bracket 100 includes a base plate 102 along with a plurality of substantially perpendicular plates 104 extending away from each side of the base 102. An arm 106 extends diagonally from the top of a plate 104 toward where an adjacent plate 104 meets with the base 102. In the illustrated example, the cable bracket 100 includes five plates 104 on each side with four arms 106 positioned therebetween. The lower end of each arm 106 is not secured to the base so that the arm 106 can be flexed or otherwise bent toward the plate 104 from which the arm extends. The arms 106 are made a semi-rigid material that tends to hold the arm 106 in the neutral position away from the plate 104 from which the arm 106 extends as illustrated in FIG. 1. When an arm 106 is flexed away from the neutral position, the arm 106 will push back toward the neutral position due to the properties of the semi-rigid material. A cable may be inserted between the arm 106 and the adjacent plate 104 and will be pinched between the arm 106 and the adjacent plate 104. In this way, a cable securing area 120 is formed between the free end of an arm 106 and the adjacent plate 104 toward which the arm 106 approaches.

The cable bracket 100 in this embodiment further includes a mounting plate 108 on a first end of the base 102 and a dovetail 110 on a second end of the base 102. Screw holes 112 are included on the mounting plate 108 for securing the bracket 100 to an external surface such as a stud or joist board within a wall. A gripping surface including a plurality of ridges 114 is formed on both the outward facing side of the arm 106 and the arm-facing side of the adjacent plate 104. Ridges 114 are included on the outward facing side of the final plate 104 near the dovetail 110 in this embodiment to support attachment to another cable bracket (described later with reference to FIG. 12, for example).

Figure 2:
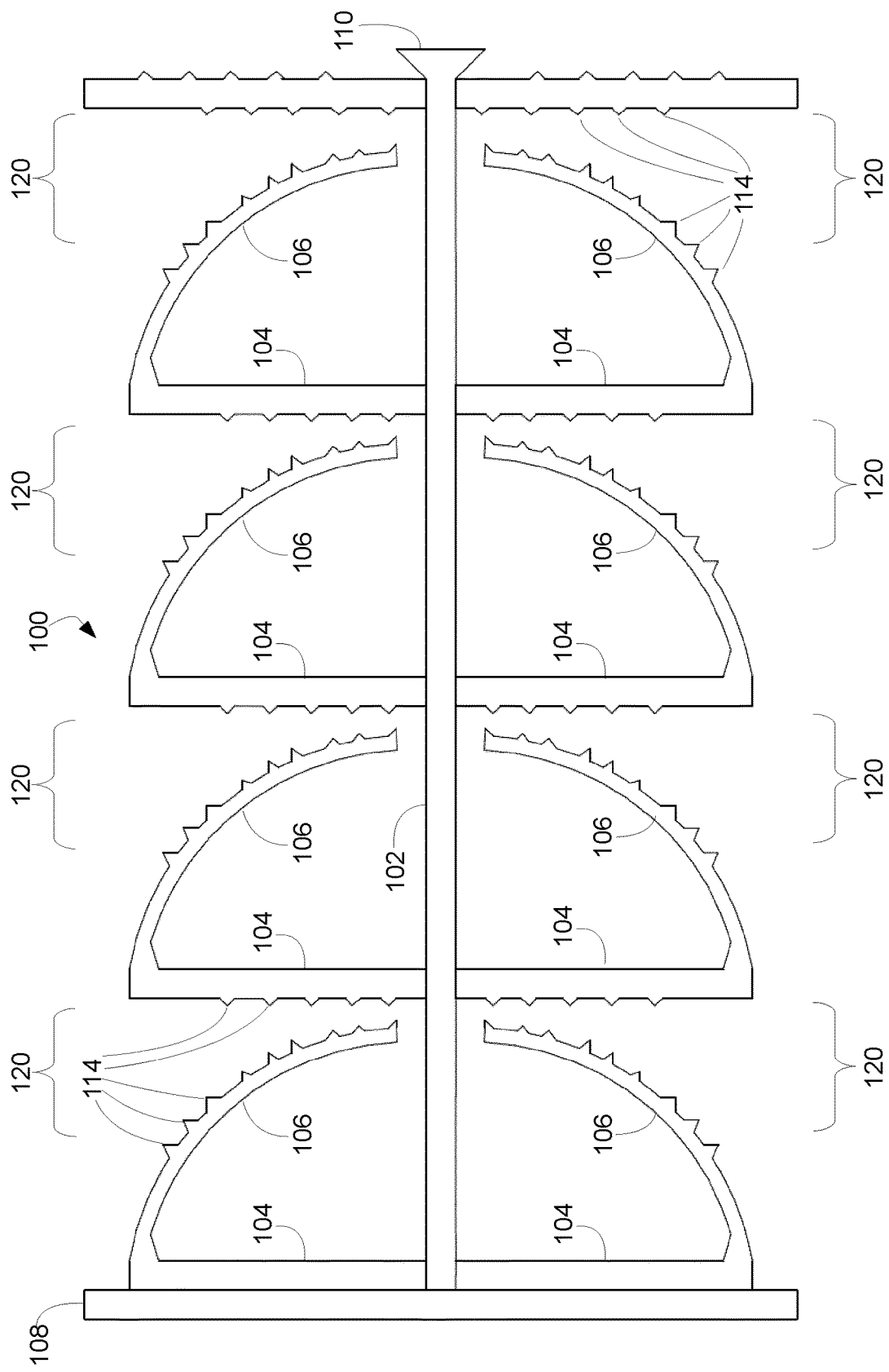
FIG. 2 shows a top view of the cable bracket of FIG. 1.
Figure 3:
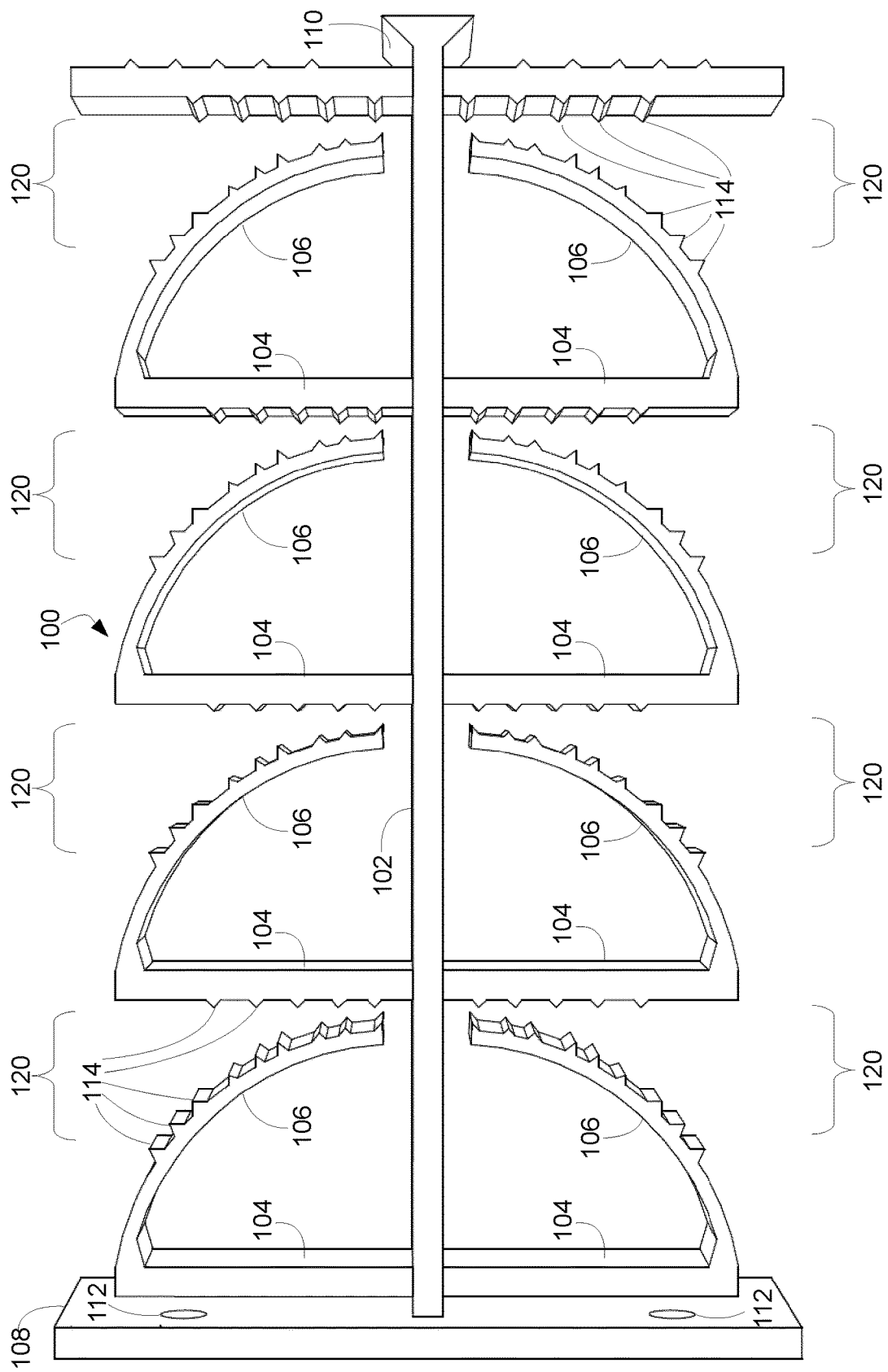
FIG. 3 illustrates a projection top view of the cable bracket of FIG. 1.

FIG. 2 shows a top view of the cable bracket 100 of FIG. 1, and FIG. 3 illustrates a projection top view of the cable bracket 100. The projection top view in FIG. 3 add a slight three-dimensional viewing effect on the left and right sides in order to better illustrate items such as the ridges 114 and the screw holes 112. As illustrated in both FIG. 2 and FIG. 3, a separate cable securing area 120 is formed between each arm 106 and the adjacent plate 104 toward which the arm 106 extends. Since there are eight arms 106 in this example, a total of eight corresponding cable securing areas 120 are provided on the cable bracket 100 in this embodiment.

Figure 4:
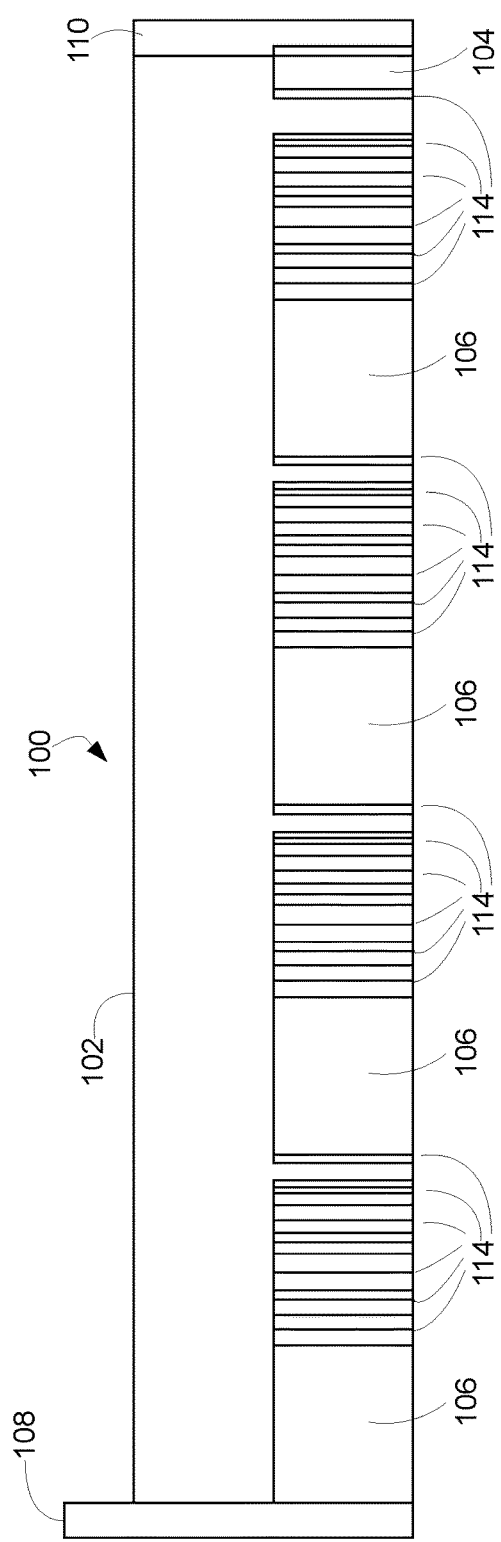
FIG. 4 shows a side view of the cable bracket of FIG. 1.
Figure 5:
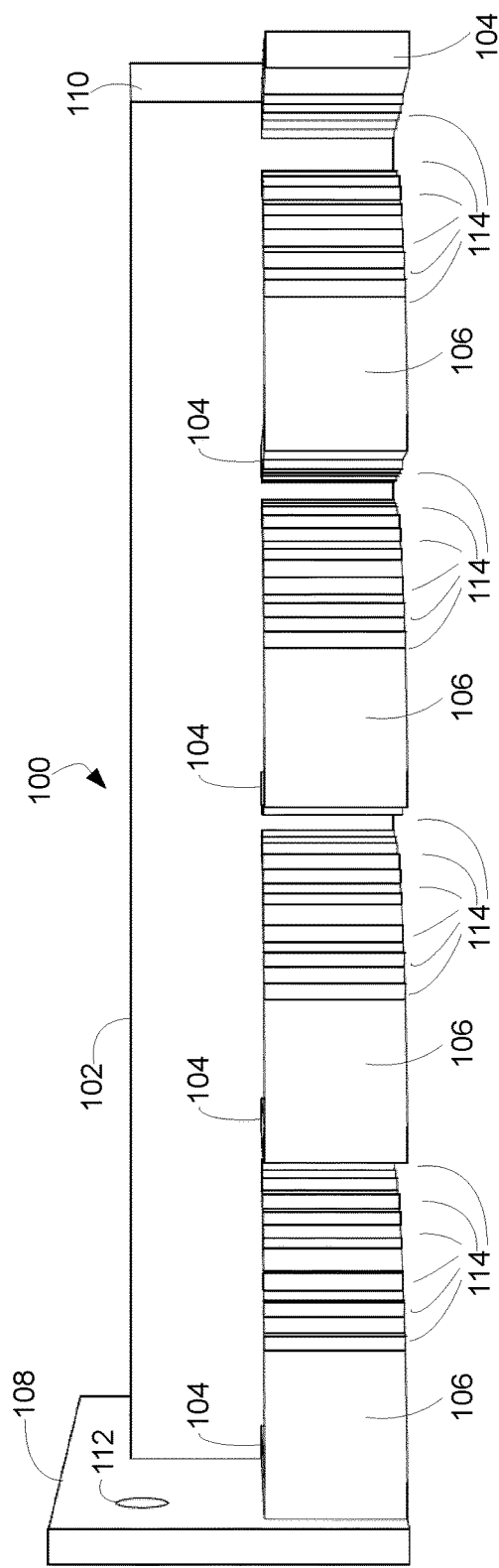
FIG. 5 shows a projection side view of the cable bracket of FIG. 1.

FIG. 4 shows a side view of the cable bracket of FIG. 1, and FIG. 5 shows a projection side view of the cable bracket of FIG. 1. Again, the projection side view in FIG. 5 adds a slight three-dimensional viewing effect on the left and right sides of the figure in order to better illustrate items such as the plates 104 and the screw holes 112.

Figure 6:
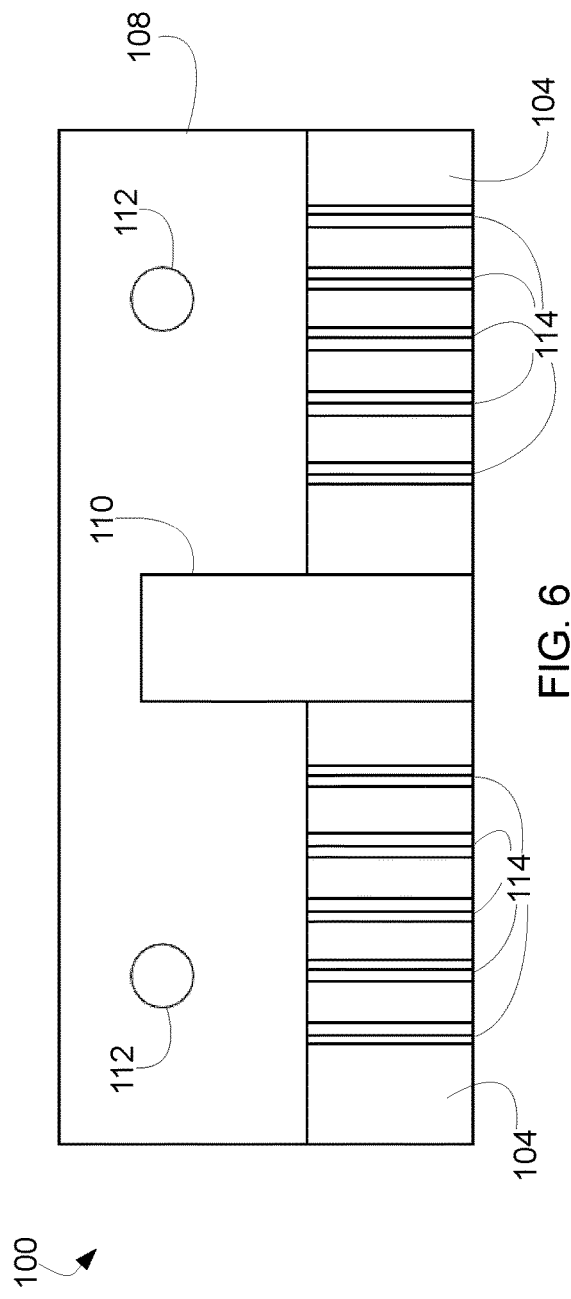
FIG. 6 shows an end view of the cable bracket of FIG. 1.
Figure 7:
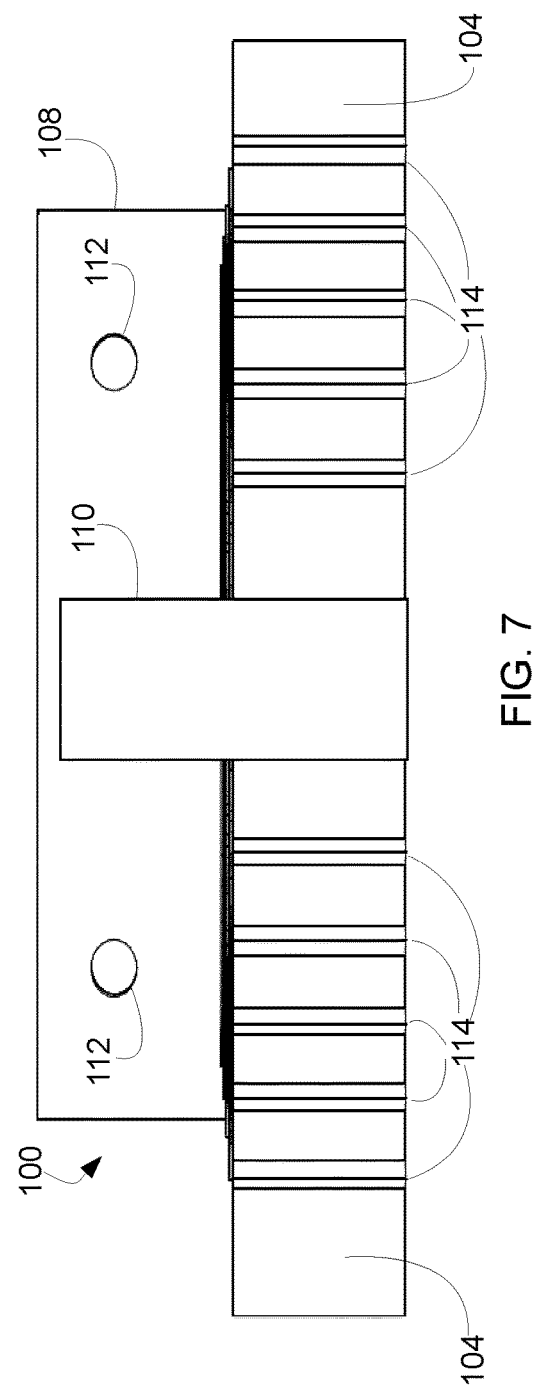
FIG. 7 shows a projection end view of the cable bracket of FIG. 1.

FIG. 6 shows an end view of the cable bracket of FIG. 1, and FIG. 7 shows a projection end view of the cable bracket of FIG. 1. The projection end view in FIG. 7 adds an exaggerated three-dimensional viewing effect where the dovetail 110 side of the image is wider than the mounting plate 108 side in order to better illustrate items such as the end plate plates 104 at the end of the base 102 near the dovetail 110.

Figure 8:
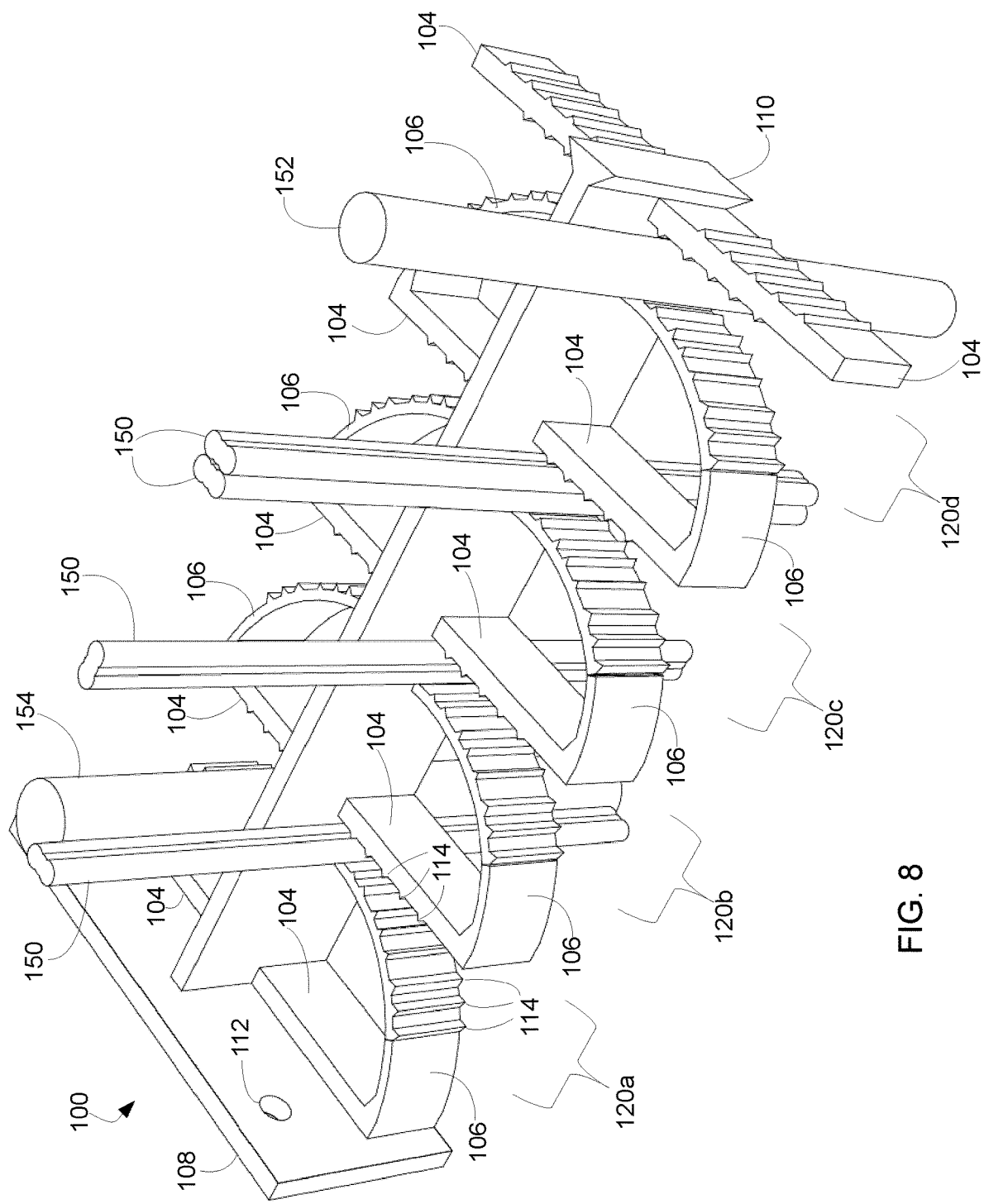
FIG. 8 shows a first perspective view of the cable bracket of FIG. 1 while supporting a plurality of electrical cables according to an exemplary embodiment.

FIG. 8 shows a first perspective view of the cable bracket 100 of FIG. 1 while supporting a plurality of electrical cables 150, 152, 154 according to an exemplary embodiment. Since the arms 106 are made of a semi-rigid material such as plastic or metal, each arm 106 can be deflected from the neutral position by a user in order to insert one or more cables 150, 152, 154 between the arm 106 and an adjacent plate 104. As illustrated, the adjacent plate 104 in a particular cable securing area 120 is the plate 104 toward which the arm 106 approaches while the arm 106 is in the neutral (i.e., unflexed position) position. The combination of the arm 106 and the adjacent plate 104 form a cable securing area 120 that holds one or more cables 150, 152, 154.

Figure 9:
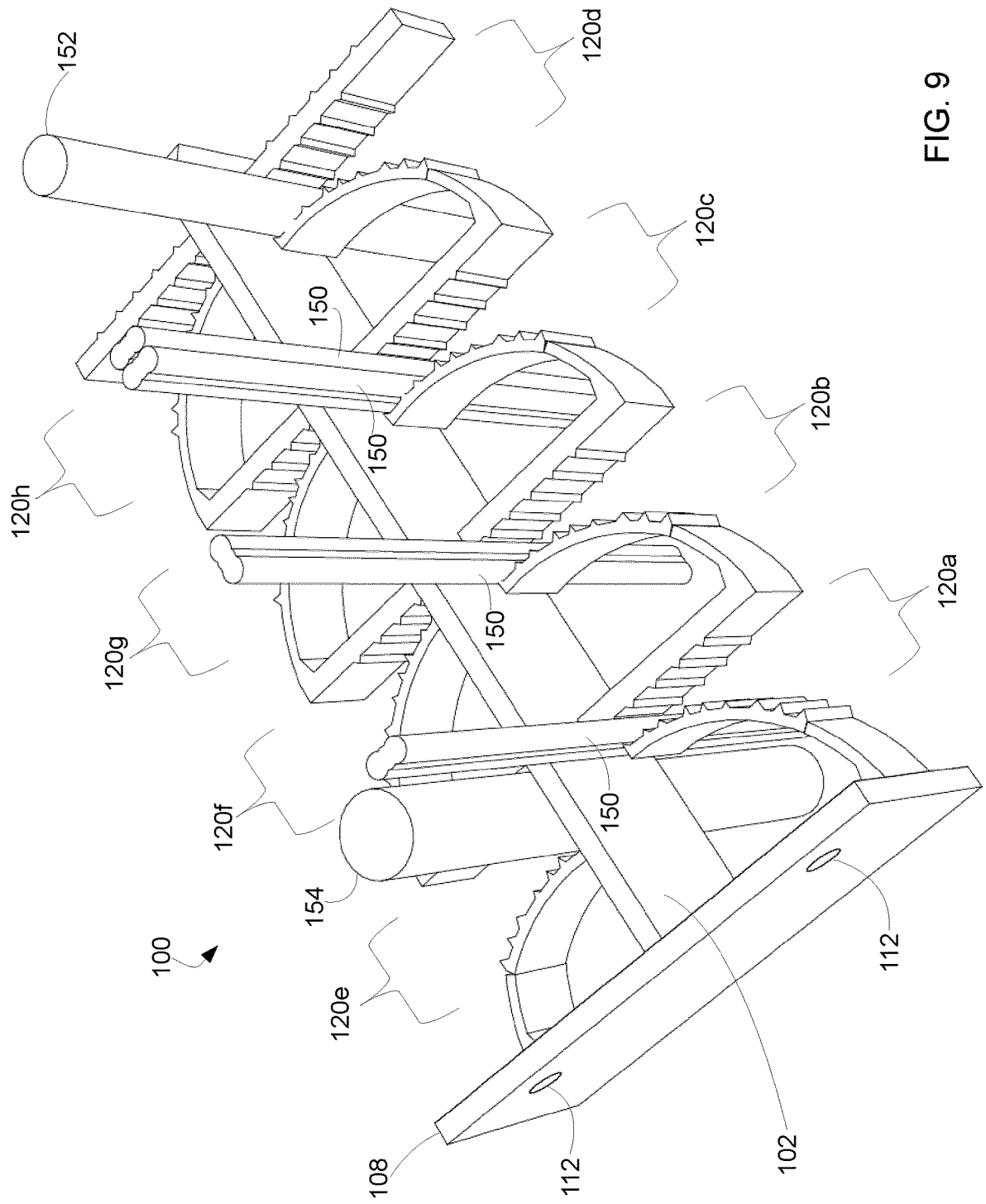
FIG. 9 shows a second perspective view of the cable bracket of FIG. 8 while supporting the electrical cables.
Figure 10:
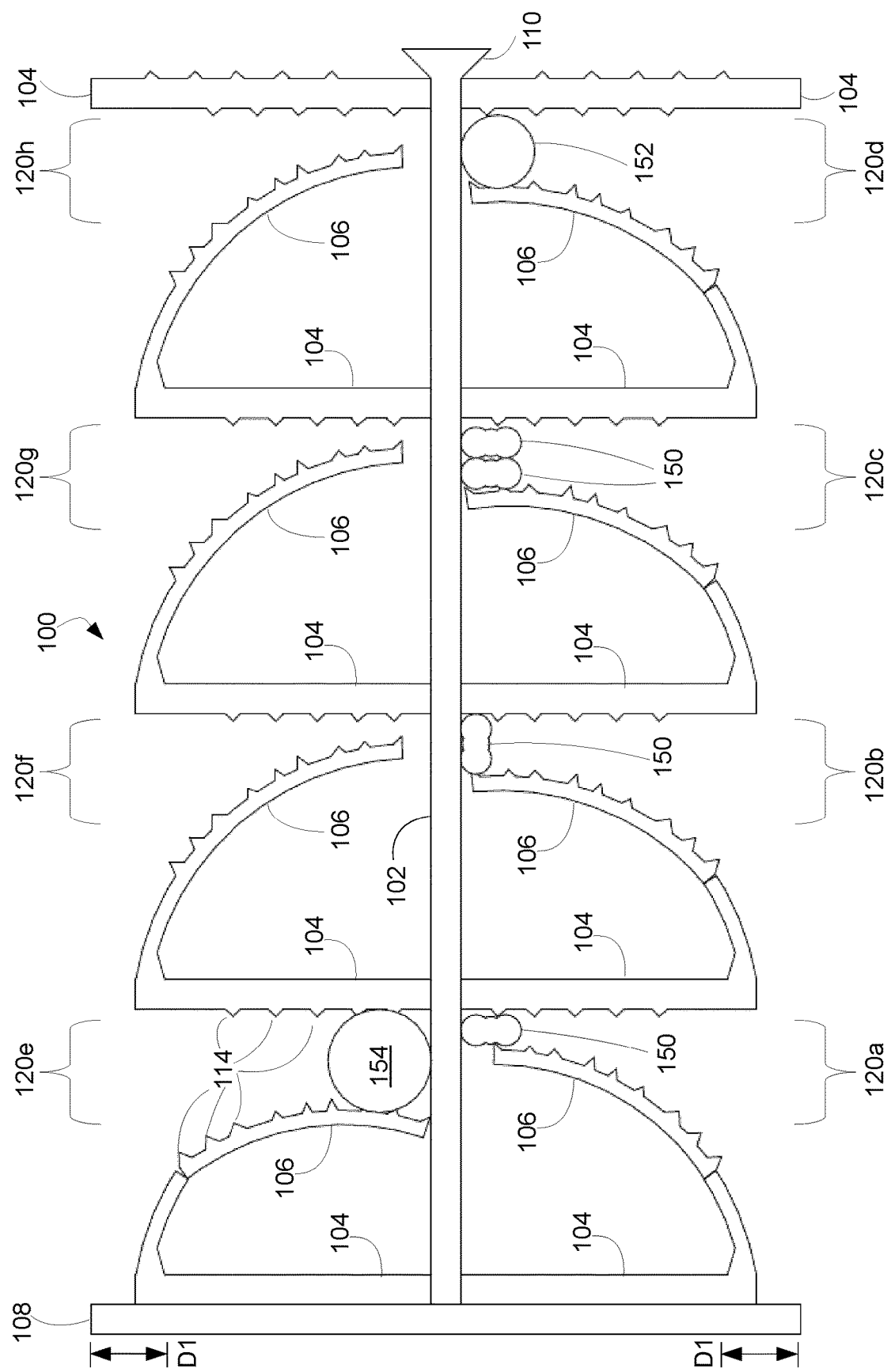
FIG. 10 shows a top view of the cable bracket of FIG. 8 while supporting the electrical cables.
Figure 11:
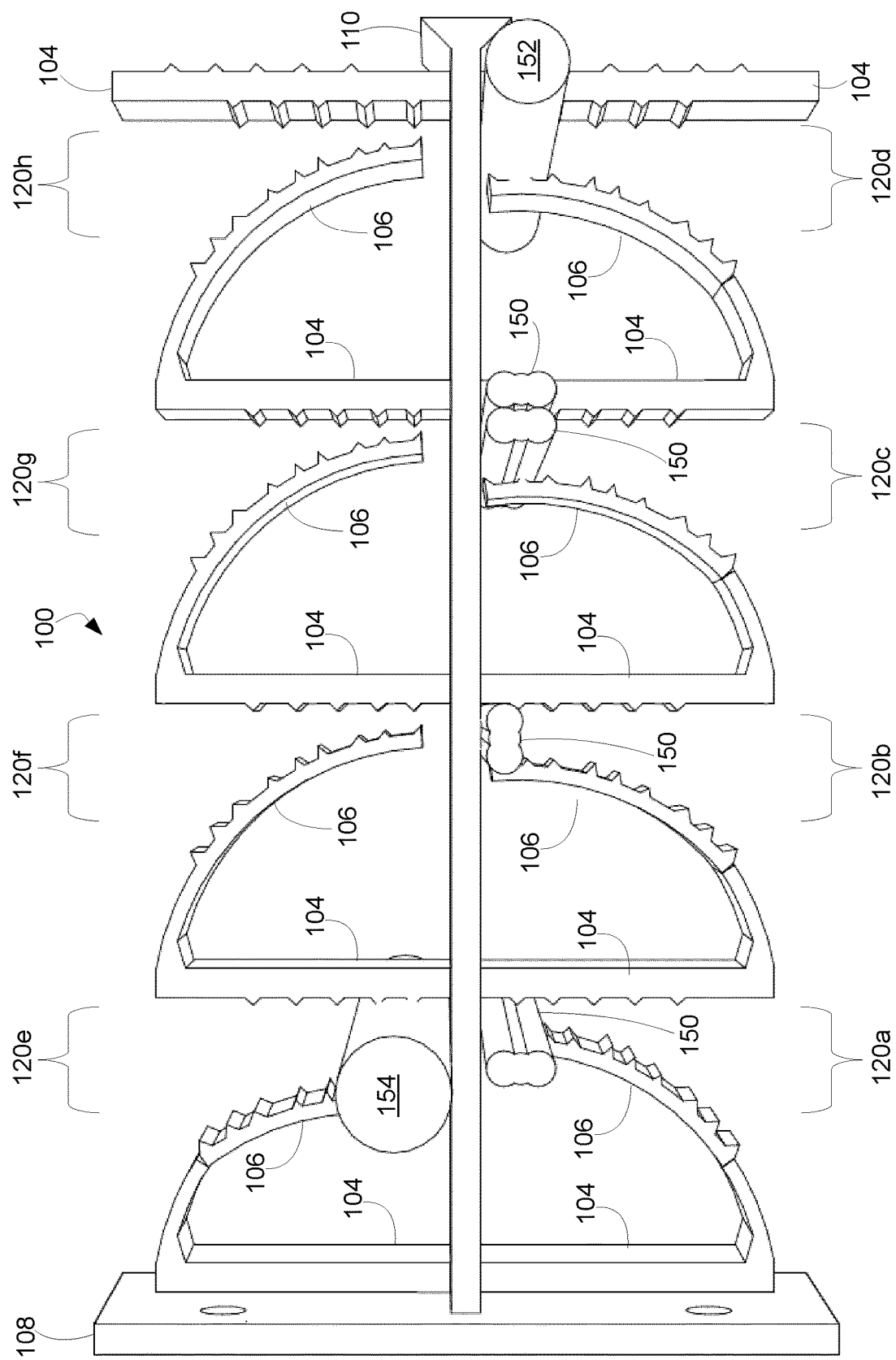
FIG. 11 shows a projection top view of the cable bracket of FIG. 8 while supporting the electrical cables.

FIG. 9 shows a second perspective view of the cable bracket 100 of FIG. 8 while supporting the electrical cables 150, 152, 154. Likewise, FIG. 10 shows a top view of the cable bracket 100 while supporting the electrical cables 150, 152, 154, and FIG. 11 shows a projection top view of the cable bracket 100 while supporting the electrical cables 150, 152, 154.

In this example, there are three types of cables 150, 152, 154 including a first type of cable 150 having a flattened shape, a second type of cable 152 having a circular shape of smaller diameter, and a third type of cable 154 having a circular shape of larger diameter. In addition to the different types and sizes of cables 150, 152, 154 illustrated in this example, the cable bracket 100 beneficially allows different orientations, sizes, shapes, and number of cables 150, 152, 154 to be held in the available cable securing areas 120 even though the structure of each cable securing area 120 is the same in this embodiment.

A first cable securing area 120a is utilized in this example to hold a single cable 150 of the flat type and the flat cable 150 has been orientated to minimize its width between the arm 106 and the adjacent plate 104 forming the first securing area 120*a*. The ridges 114 run parallel to the direction of the cable 150 and help ensure that the cable 150 remains secured within the first cable securing area 120*a*. The pressure extorted by the arm 106 and the ridges 114 within the first cable securing area 120*a* tightly hold the cable 150 against the adjacent plate 104.

A second cable securing area 120*b* is utilized to hold a single flat cable 150; however, the flat cable 150 in this example is orientated such that its width is maximized between the arm 106 and the adjacent plate 104 forming the second securing area 120*b*. The fact that the cable securing areas 120 can hold flat cables 150 in either narrow or wide orientations is beneficial to support different wiring projects where a particular cable orientation is preferred or more suitable given the building wiring requirements. The cable bracket 100 in this embodiment beneficially supports both the narrow and wide orientations of flat cables 150.

A third cable securing area 120*c* is utilized in this example to hold two flat cables 150 pressed together thereby forming a square shape. Again, the ridges 114 help secure each of the two cables in position. Although only two cables 150 are shown in this example, a cable securing area 120 may similarly support an additional number of cables 150. For instance, four flat cables 150 may be held in a single cable securing area 120 in a similar manner. Likewise, three flat cables 150 could be pressed together and orientated similar to the orientation shown in the second cable securing area 120*a*. In both cases, the ridges 114 along with the forces extorted by the arm 106 trying to return to the neutral position secure each of the multiple cables 150 so that they stay held within the cable securing area 120.

A fourth cable securing area 120*d* is utilized in this example to hold the smaller diameter circular cable 152. Again, the ridges 114 formed on the gripping surface of the arm 106 and the adjacent plate 104 within the fourth cable securing area 120*d* hold the circular cable 152 in position.

A fifth cable securing area 120*e* is utilized in this example to hold the larger diameter circular cable 154. The two different cable diameters 152, 154 are illustrated in this example to show how the cable bracket 100 beneficially allows different diameters of circular cables 150, 154 to be mounted. Other diameters either smaller or larger than those illustrated in this example may be held by the bracket 100 in a similar manner.

Unused cable securing areas 120*f*, 120*g*, 120*h* are not currently holding any cables in this example; however, these unused areas 120*f*, 120*g*, 120*h* may also be employed to hold cables as required by a user. For instance, at a later time during initial building cable installation or during a renovation project, a new cable may need to be run. Since each of the cable securing areas 120 supports any size, shape, and number of cables that can reliably be held in position between the arm 106 and the adjacent plate 104, an exemplary advantage of the cable bracket 100 in this embodiment is that it is not fixed to a particular set of predetermined cables. The bracket 100 is instead flexible and supports a large number of cable types/sizes that do not need to be chosen or otherwise selected in advance.

As mentioned in the background section, a requirement of some electrical codes such as the CEC is that cables attached to and running along a stud or other framing member need to be a minimum distance (e.g., 32 mm) from the edge of the framing member. A benefit of the cable bracket 100 in this embodiment is that the cables 150, 152, 154 are not stapled or otherwise attached to the framing member. As such, the minimum spacing requirement under the CEC does not apply when the cable bracket 100 is utilized to hold the cables 150, 152, 154. However, to still ensure minimum spacing even for cables 150, 152, 154 not directly attached to a framing member, the distance D1 illustrated in FIG. 10 may be ensured to be at least the required minimum spacing. D1 is the distance from the edge of the mounting plate 108 to where the ridges 114 or other protrusions on the gripping surface of the arm 106 begin. D1 represents the absolute minimum distance a cable 150, 152, 154 would be held from the edge of the mounting plate 108 assuming the cable 150, 152, 154 is within the gripping surface of the arm 106. By positioning the edge of the mounting plate 108 of the bracket 100 flush with the edge of the framing member, the distance D1 represents the minimum distance that the cable 150, 152, 154 will be from the edge of the framing member. Different cable brackets 100 may be manufactured having different D1 distances to meet different codes. Alternatively, the mounting plate 108 may be removable from the bracket 100 and replaceable with an alternative mounting plate 108 such that a mounting plate 108 having the desired D1 distance may be installed on the cable bracket 100.

Of course, in actual practice, the cables 150, 152, 154 will typically not reach the end of the gripping surface and will be much closer to the base plate 102. Likewise, the edge of the mounting bracket 108 may be mounted such that it does not extend all the way to edge of the stud. Both of these factors will tend to ensure that the actual distance the cable 150, 152, 154 is held from the edge of the stud by bracket 100 will in practice be greater than D1.

Figure 12:
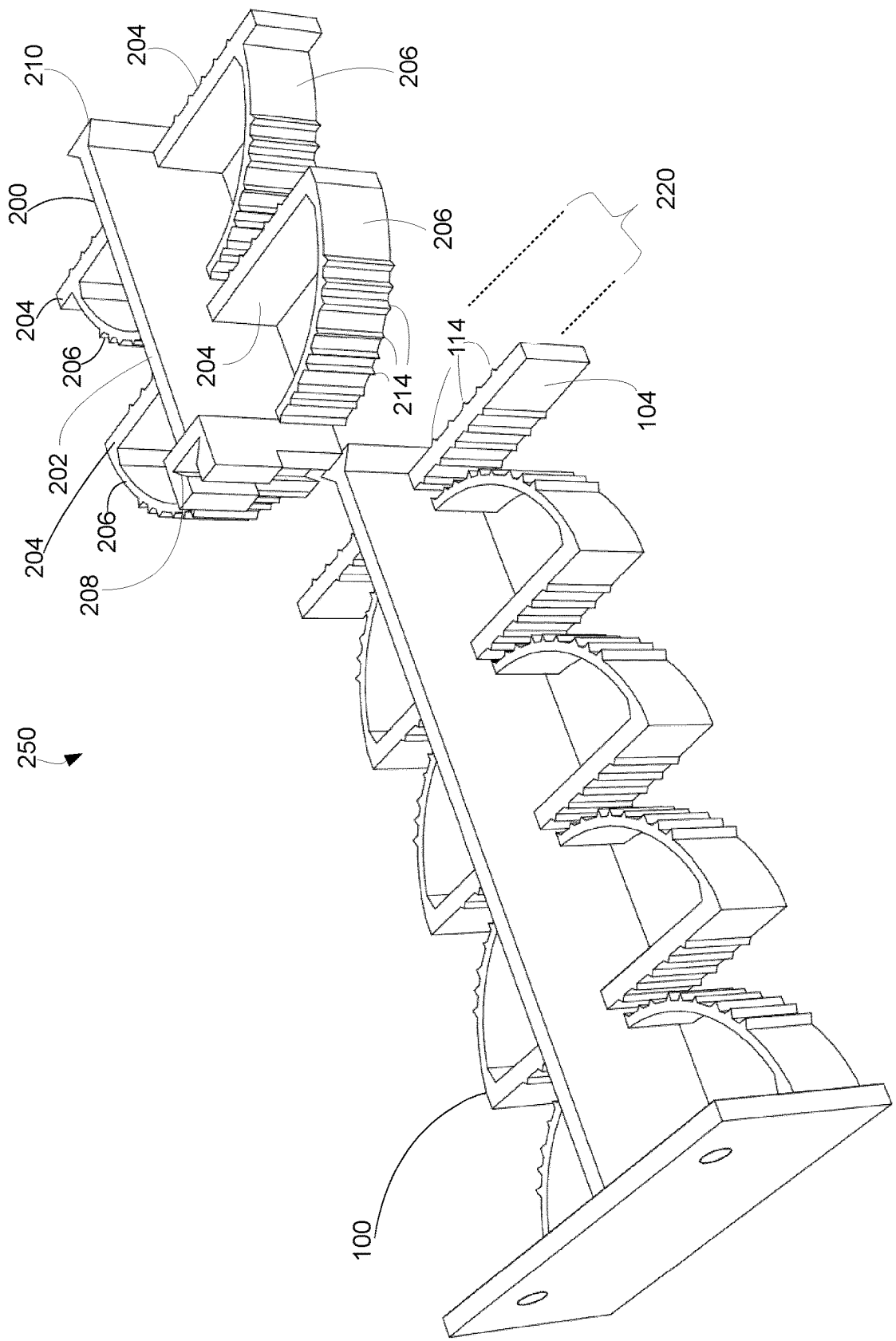
FIG. 12 shows a perspective view of a cable bracket assembly formed by the cable bracket of FIG. 1 being coupled to a second cable bracket according to an exemplary embodiment.

FIG. 12 shows a perspective view of a cable bracket assembly 250 formed by the cable bracket 100 of FIG. 1 being coupled to a second cable bracket 200 according to an exemplary embodiment. The second cable bracket 200 in this embodiment includes a dovetail slot 208 that is configured to accept and mate with the dovetail 110 of the first cable bracket 100. The second cable bracket 200 further includes a base plate 204 and a plurality of plates 204 extending substantially perpendicular therefrom. Ridges 214 are included on the gripping surfaces of the plates 204 and arms 206. In this example, there are four arms 206 on the second cable bracket 200 and therefore an additional four cable securing areas 220 are formed when the second cable bracket 200 is attached to the first cable bracket 100.

On the first cable bracket 100 already described, the final plate 104 near the dovetail 110 has ridges 114 on both sides. Furthermore, the arms 206 on the second cable bracket 200 curve in an opposite direction relative to the arms 106 of the first cable bracket 106. In this way, when the first cable bracket 100 is attached to the second cable bracket 200, the first set of arms 206 on the second cable bracket 200 curve toward the backside of the final plate 104 of the first cable bracket 100 in order to form cable securing areas 220 between first arms 206 on the second bracket 200 and final plates 104 on the first cable bracket 100.

The rear of the second cable bracket 200 further includes a dovetail 210, which may be coupled to a third cable bracket (not shown) of the same structure as the second cable bracket 200. In this way, the first cable bracket 100 includes a mounting plate 108 that can be secured to a building framing member such as a stud, and any number of second cable brackets 200 can be added as required in order to extend the cable securing capacity of the assembly 250 by adding any number of additional cable securing areas 220 that are required for a particular wiring project or a later renovation project.

Figure 13:
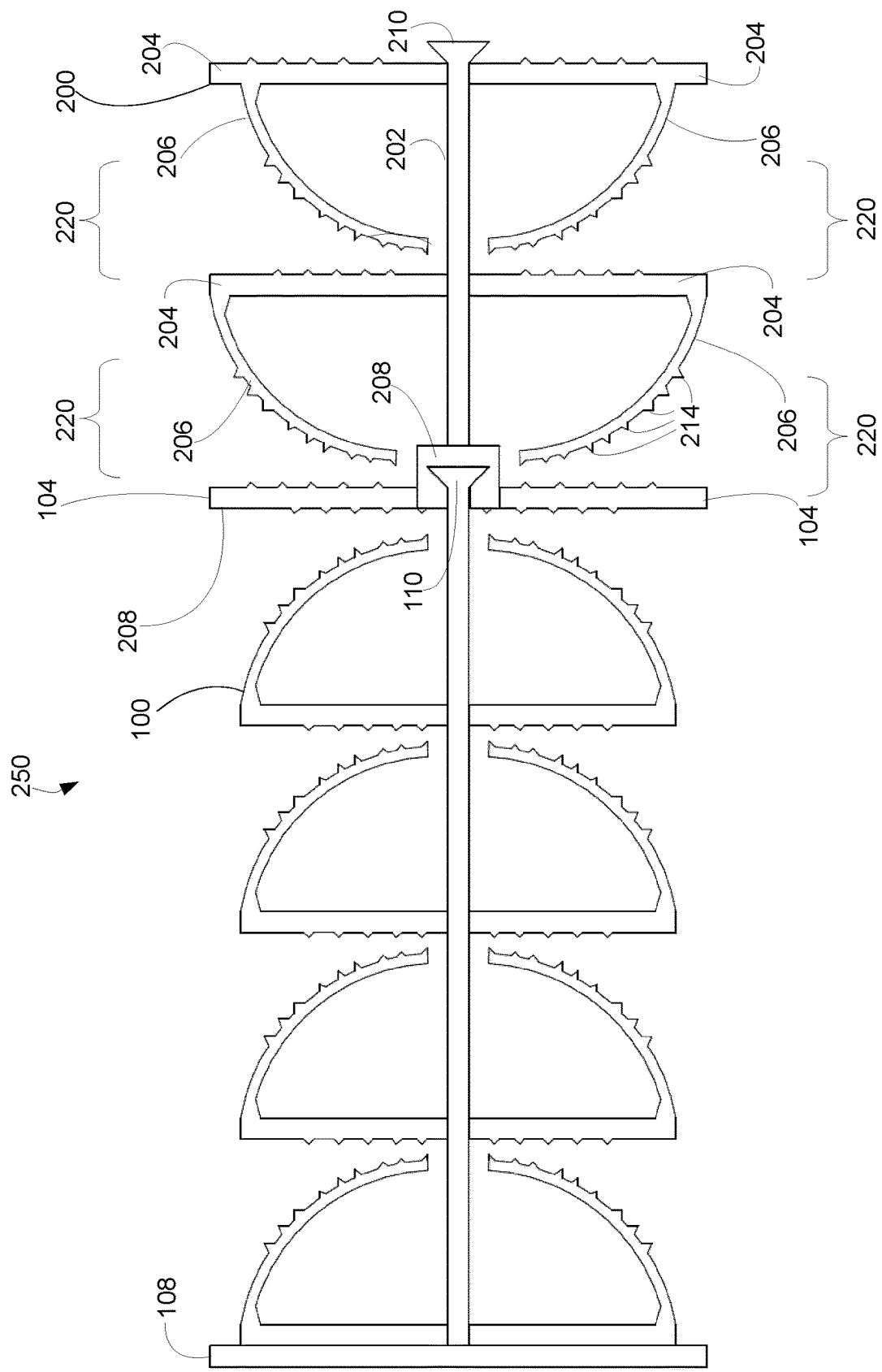
FIG. 13 shows a top view of the assembly of FIG. 12.
Figure 14:
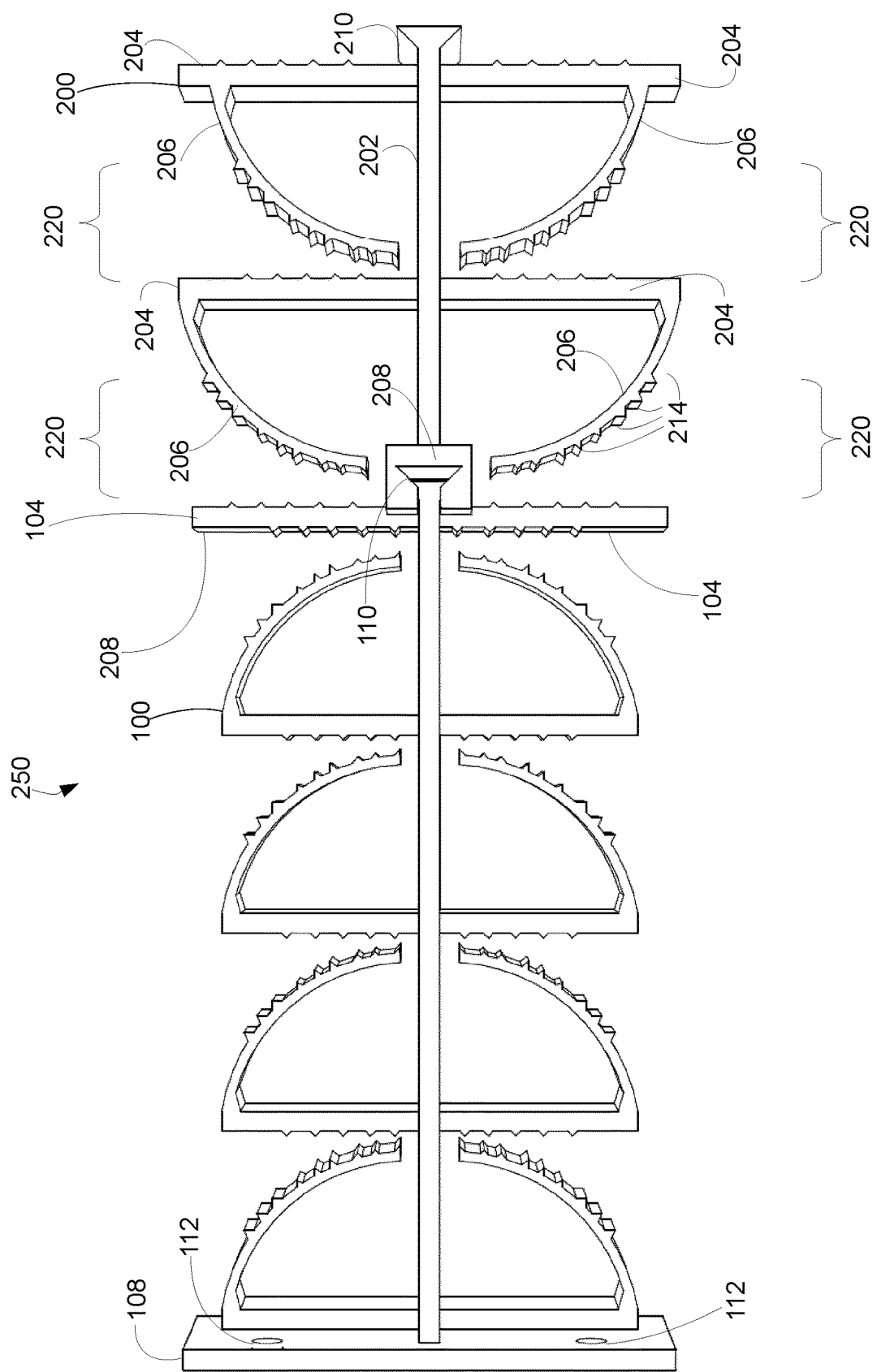
FIG. 14 shows a projection top view of the assembly of FIG. 12.
Figure 15:
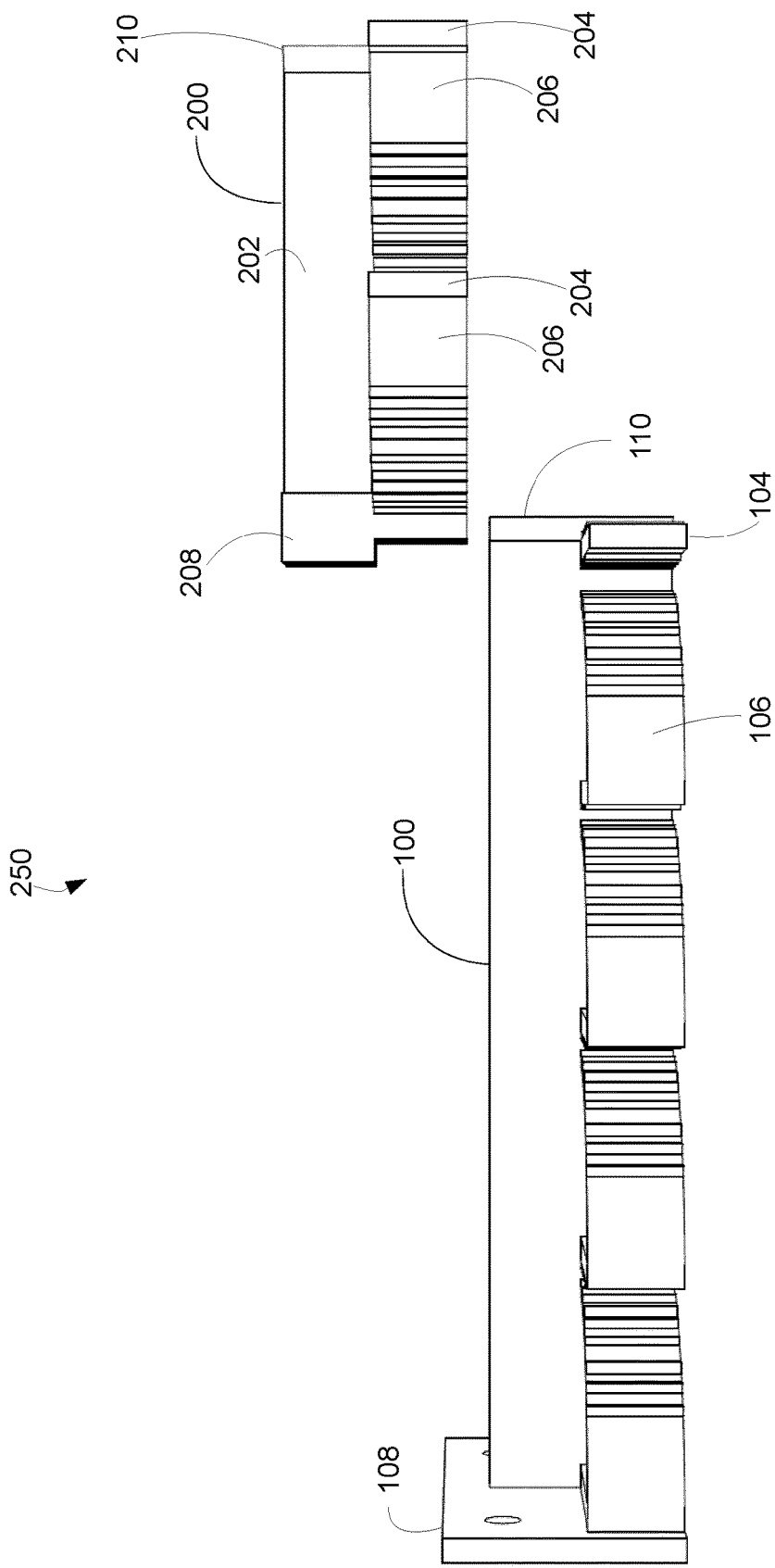
FIG. 15 shows a side view of the assembly of FIG. 12 prior to the two cable brackets being joined together.

FIG. 13 shows a top view of the assembly 250 formed by the combination of first cable bracket 100 and the second cable bracket 200, and FIG. 14 shows a projection top view of the assembly 250 of two cable brackets 100, 200. The projection top view adds a slight three-dimensional viewing effect on the left and right sides of the figure in order to better illustrate items such as the plates 204 and the screw holes 112. Finally, FIG. 15 shows a side view of the assembly 250 prior to the combination of first cable bracket 100 and the second, adjoining cable bracket 200 being joined together.

Figure 16:
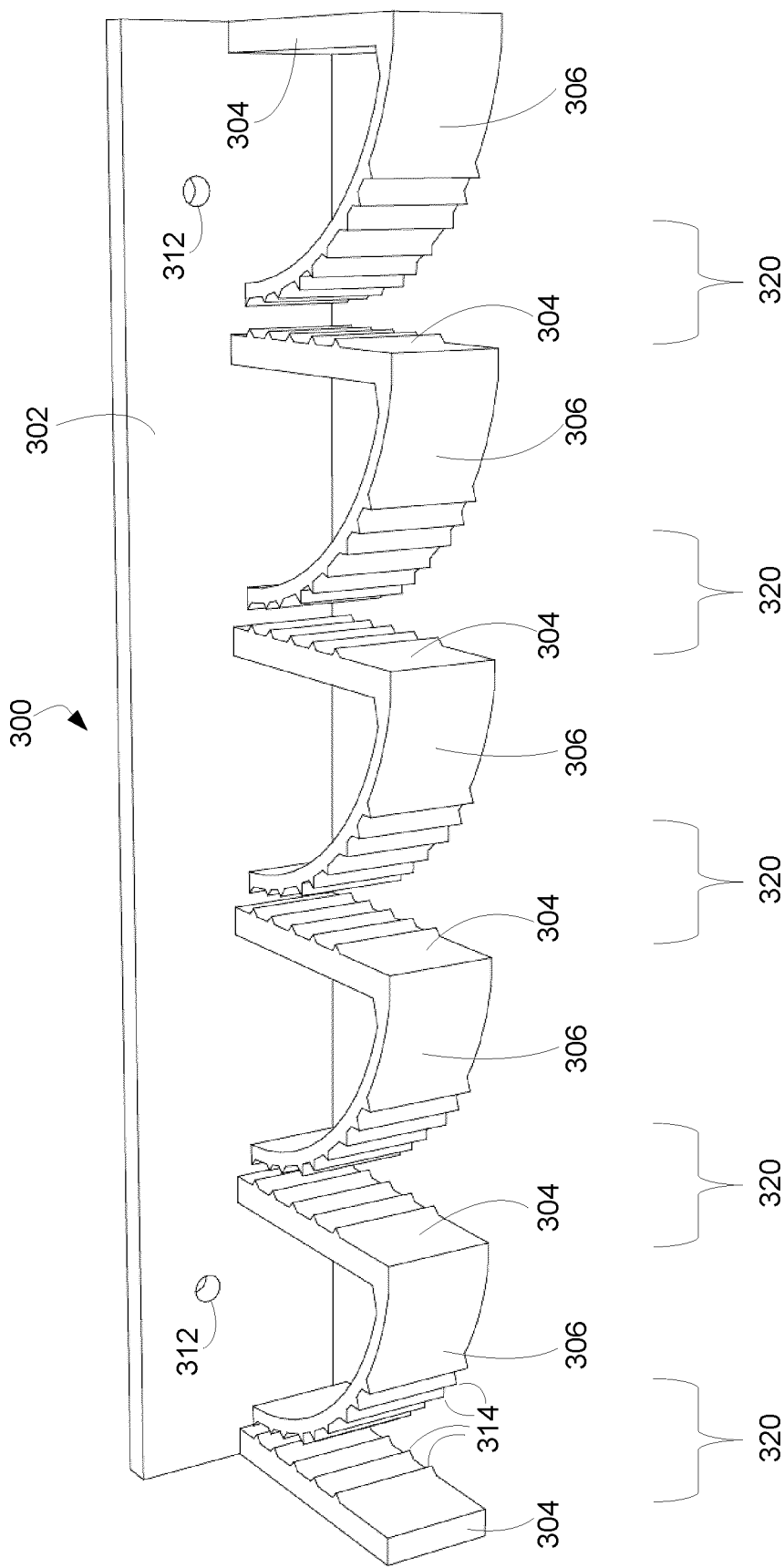
FIG. 16 shows a perspective view of a single-sided cable bracket according to an exemplary embodiment.

FIG. 16 shows a perspective view of a single-sided cable bracket 300 according to an exemplary embodiment. The cable bracket 300 in this embodiment includes a base plate 302 from which a plurality of plates 304 extend at an angle substantially perpendicular to the base 302. A plurality of arms 306 extend from the near the outer ends of a plurality of the plates 304 and curve toward the bottom of an adjacent plate 304. As before, the arms 306 are made of a semi-rigid material and are not attached to the base 312 at the end closest to the adjacent plate 304. In this way, each arm 306 can be flexed in order to pinch a cable or wire between a gripping surface of the arm 304 (i.e., the side of the arm with a plurality of ridges 314 or other protrusions to help secure the cable in position) and a gripping surface of the adjacent plate 304 (i.e., the side of the adjacent plate 304 with a plurality of ridges 314 or other protrusions to help secure the cable in position).

Unlike the previous cable brackets 100, 200, the cable bracket 300 in FIG. 16 only includes plates 304 coming off one side of the base 302. In this way, the other side of the base 302 can be run flush along the surface of a framing member such as a building stud or joist board. The base 302 includes a plurality of screw holes 312 for mounting the bracket 300 to the framing member.

When employed for securing cables and wires, the single-sided bracket 300 may be utilized in a similar manner to as previously described. In particular, each arm 306 and the adjacent plate 304 toward which the arm 304 extends form a cable securing area 320 that may hold one of more cables. In the example shown in FIG. 16, there are a total of five arms 306 and therefore a corresponding five cable securing areas 320 are formed.

Figure 19:
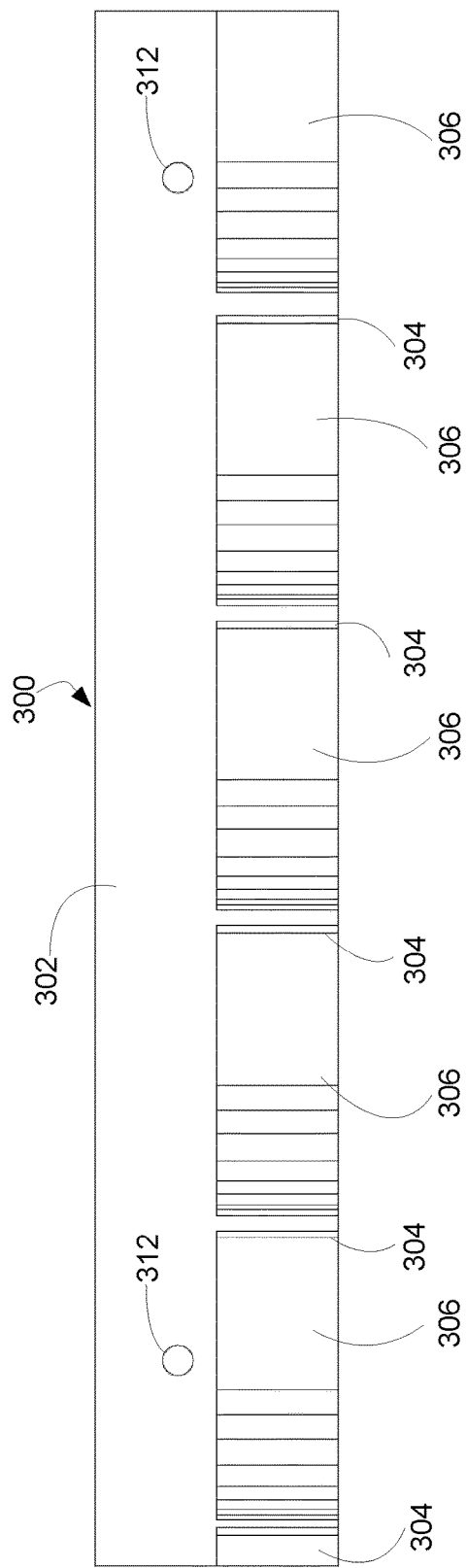
FIG. 19 shows a side view of the single-sided cable bracket of FIG. 16.
Figure 20:
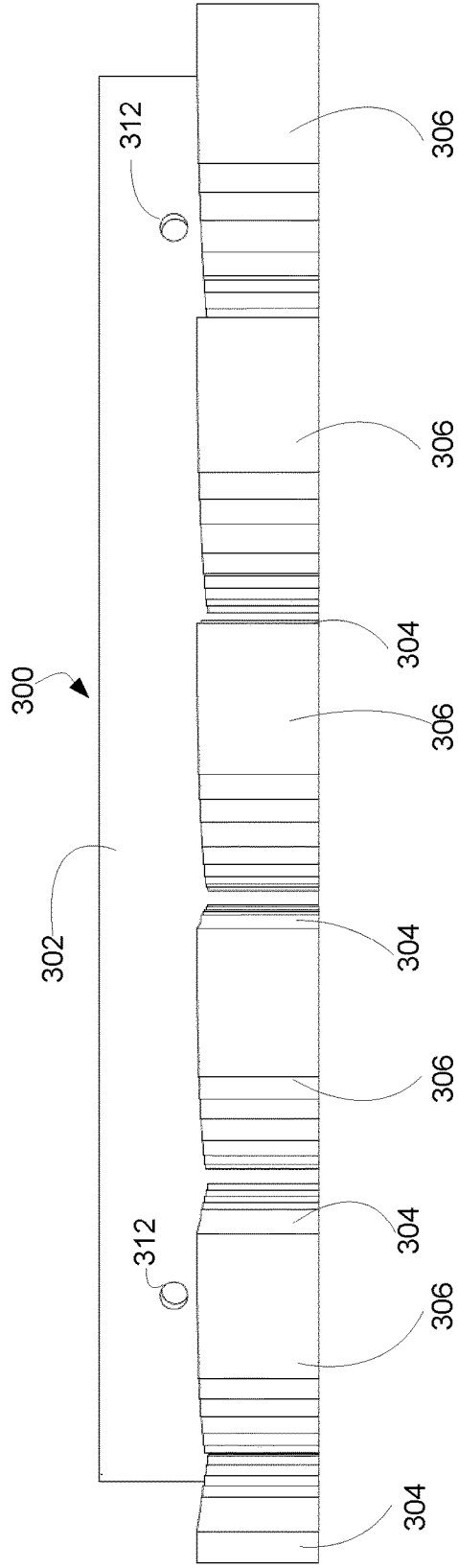
FIG. 20 shows a projection side view of the single-sided cable bracket of FIG. 16.

FIG. 17 shows a top view of the single-sided cable bracket 300 of FIG. 16, and FIG. 18 shows a projection top view of the single-sided cable bracket 300. The projection top view illustrated in FIG. 18 adds a slight three-dimensional effect on the right and left sides to help illustrated the ridges 314 and heights of the arms 306 and plates 304. FIG. 19 shows a side view of the single-sided cable bracket 300, and FIG. 20 shows a projection side view of the single-sided cable bracket 300 of FIG. 16. Again, the projection side view in FIG. 20 adds an exaggerated three-dimensional viewing effect where the side of the bracket 300 from which the arms 306 and plates 304 extend is wider than the mounting side of the base 302.

Figure 21:
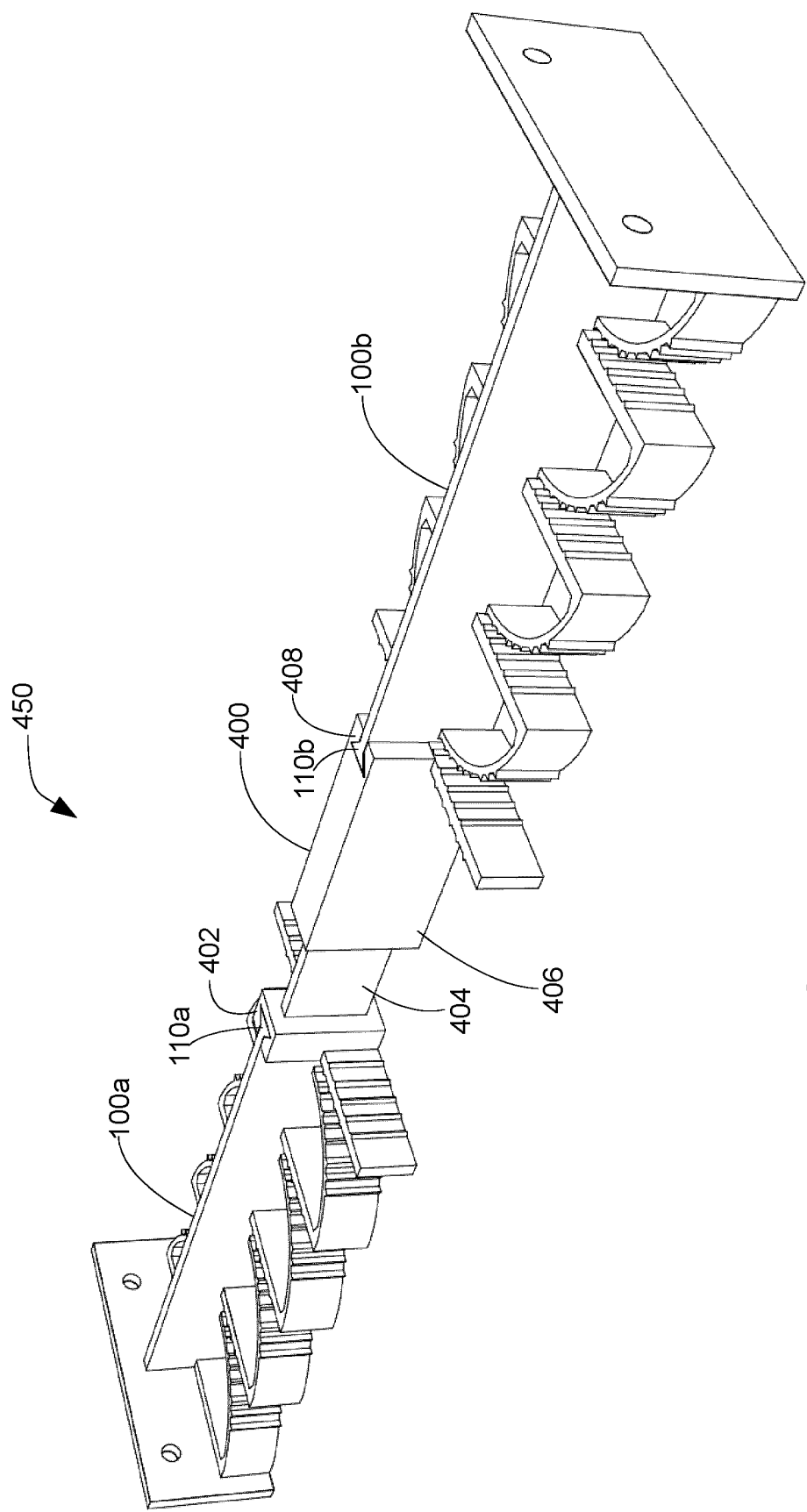
FIG. 21 shows a perspective view of a cable bracket assembly formed by a first cable bracket coupled to a second cable bracket utilizing an intermediate slider support according to an exemplary embodiment.

FIG. 21 shows a perspective view of a cable bracket assembly 450 formed by a first cable bracket 100a coupled to a second cable bracket 100b utilizing an intermediate slider support 400 according to an exemplary embodiment. The first and second cable brackets 100a, 100b in this example are similar to the dual-sided cable bracket 100 previously described in FIG. 1 so a repeated description of these brackets 100a, 100b is omitted for brevity. The intermediate slider 400 includes a first end having a dovetail slot 402 adapted to mate with the dovetail 110a of the first cable bracket. The dovetail slot 402 on the slider 400 is coupled to an inner sliding rail 404 which slides along a grove slot within an outer sliding housing 406. The opposite end of the sliding housing 406 includes a dovetail slot 408 adapted to mate with the dovetail 110b of the second cable bracket 100b. In this way, the slider 400 couples the first cable bracket 100a to the second cable bracket 100b.

Since the inner sliding rail 404 can extend and retract within the sliding housing 406, the slider 400 allows the first and second brackets 100a, 100b to be coupled to one another in different applications having different distances between the two cable brackets 100a, 100b. This may be beneficial when each of the cable brackets 100a, 100b are mounted on adjacent framing members such as two different wall studs, for example. The distance of the studs from one another may vary due to a number of factors including the widths of the stud boards themselves in addition to variations of the wall construction and building plans. In order to secure a greater number of cables than a single cable bracket 100 can handle, two cable brackets 100a, 100b may be utilized on opposite studs. In order to provide additional lateral stability between the two cable brackets 100a, 100b, the slider support 400 may be installed between the brackets 100a, 100b. In this way, any downward drooping or other bending forces experienced by one cable bracket 100a, 100b will be countered by the opposite cable bracket 100a, 100b through the slider 400.

For instance, in view of the example in FIG. 21, if the first cable bracket 100a tries to bend downward at the end nearest the dovetail 110a, the slider 400 transfers these forces to the second cable bracket 408 and the second cable bracket 408 tends to support the first cable bracket 100a. Without the slider 400, the two cable brackets 100a, 100b may both bend downward at their dovetail ends 110a, 110b, but with the slider 400 positioned therebetween, the downward bending is reduced on both brackets 110a, 110b.

Figure 22:
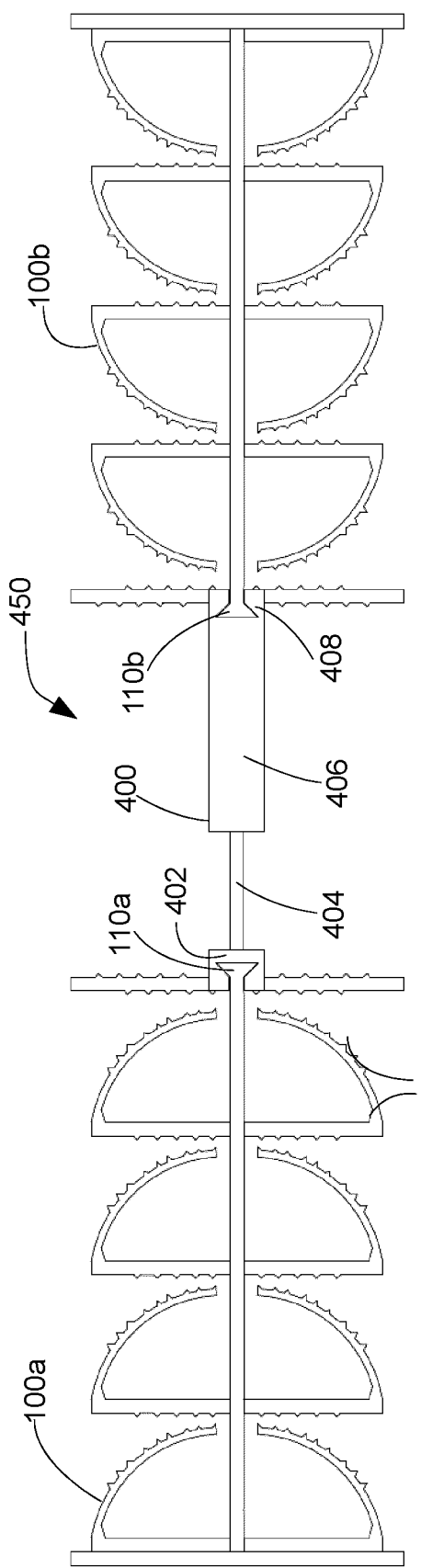
FIG. 22 shows a top view of the assembly of FIG. 21.
Figure 23:
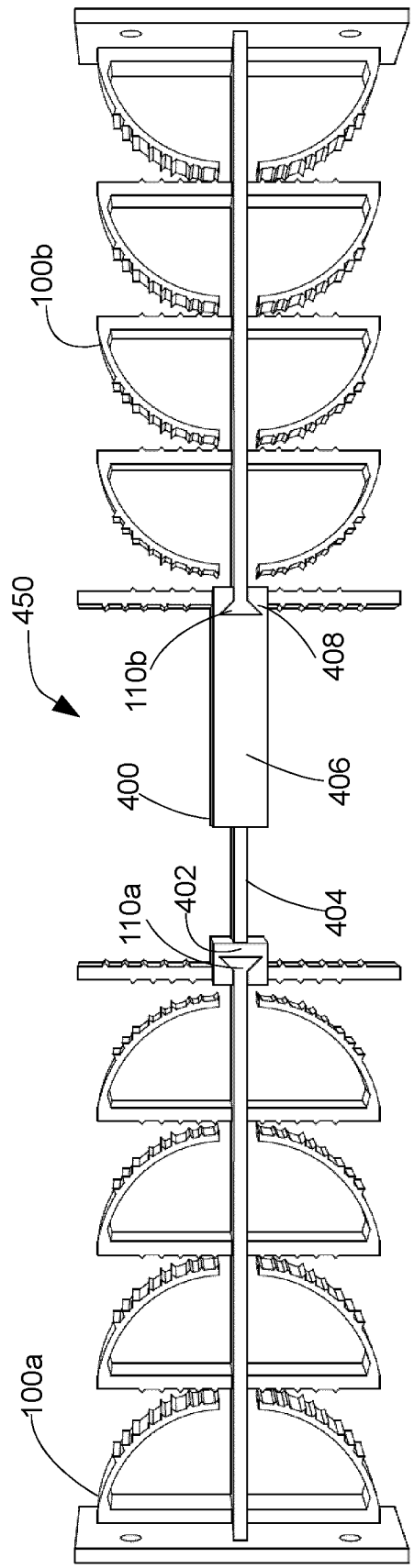
FIG. 23 shows a projection top view of the assembly of FIG. 21.

FIG. 22 shows a top view of the assembly 450 of FIG. 21 including the combination of first and second cable brackets 100a, 100b coupled together utilizing the intermediate slider 400. FIG. 23 shows a projection top view of the assembly 450 and again adds a slight three-dimensional affect on the left and right sides to help the reader visualize how the assembly 450 would look from the top.

In an exemplary embodiment, a cable bracket 100, 200, 300 includes a base 102, 202, 302, first and second plates 104, 204, 304 extending from a first side of the base 102, 202, 303; and an arm 106, 206, 306 extending diagonally from an upper end connected to the first plate 104, 204, 304 at a position away from the base 102, 202, 302. The arm 106, 206, 306 extends to a lower end positioned toward the base 102, 202, 302 intermediate the first plate 104, 204, 304 and the second plate 104, 204, 304. Because the lower end of the arm 106, 206, 306 is not secured to the base 102, 202, 302 and the arm is of made of a semi-rigid material, the arm 106, 206, 306 can be deflected from a neutral position by a user in order to insert a cable 150, 152, 154 between the arm 106, 206, 306 and the second plate 104, 204, 304. A dual-sided bracket 100, 200 may be formed by including one or more plates 104, 204 and arms 106, 206 on both sides of the base 102, 202. A dovetail 110, 210 connection may allow multiple cable brackets 100, 200, 300 to be coupled in series. Two or more cable brackets 104, 204, 304 may also be coupled together utilizing intermediate slider(s) 400.

In an exemplary embodiment, a cable bracket 100, 200, 300 made of plastic is attached to a building framing member such as a wooden or metal stud and allows cables ranging in size from 14/2 to 8/3 (typical cables used in houses) to be securely attached by pushing them into a cable securing area 120, 220, 340 of the bracket 100, 200, 300. The cable securing area 120, 220, 340 holds the cable between a flat fixed plate 104, 204, 304 and a semi rigid curved arm 106, 206, 306. The arm 106, 206, 306 may be attached to and extend from a flat fixed plate 104, 204, 304 of an adjacent cable securing area 120, 220, 340. The arm 106, 206, 306 has small ridges 114, 214, 314 protruding from it which prevent the cable from coming free.

Advantageously, the cable bracket 100, 200, 300 can be quickly attached to framing members in some embodiments utilizing two wood screws one inch or longer, for example. These are common screws often available at the work site because electricians use such screws to attach device boxes to studs. Cables 150, 152, 154 can then be installed in the bracket 100, 200, 300 without the use of special tools, which is significantly faster, easier and consequently cheaper option for supporting cables than the typically utilized method of installing wooden blocking between studs described above in the background section. Labour is an expensive portion of a residential electrical installation so utilizing cable brackets 100, 200, 300 disclosed herein may reduce the overall wiring costs by saving on labour time. Furthermore, the mounting plate 108 and/or screw hole 112 positions may be sized to provide the appropriate 32 mm minimum spacing from the edges of the framing members to meet the CEC or other codes. Spacing greater than 32 mm may be included to be on the safe side and other required spacings different than 32 mm (including less than 32 mm) may also be utilized in other embodiments to meet other electrical codes for different locations and applications as required. Deflection of the cable bracket 100, 200, 300 on the end away from the framing member may be reduced by utilizing materials which are sufficiently rigid and/or by including a slider support 400 installed intermediate adjacent cable brackets to provide additional support.

Although the invention has been described in connection with preferred embodiments, it should be understood that various modifications, additions and alterations may be made to the invention by one skilled in the art without departing from the spirit and scope of the invention. For example, the cable bracket 100, 200, 300, slider 400, and parts thereof may be made of different materials in different embodiments including plastic, metal, composites and combinations thereof. In some embodiments, the cable bracket 100, 200, 300 is made of a single integral piece of material; in other embodiments, parts of the bracket 100, 200, 300 such as the plates 104 or mounting bracket 108, for example, may be separate components installed to the base 102 during manufacture or by the user prior to installation. In another example modification, different sized cable securing areas 120, 220, 320 may be formed by having different lengths of plates 104, 204, 304 and arms 106, 206, 306. A single cable bracket 100, 200, 300 may have a plurality of uniform sized cable securing areas 120, 220, 320; or a single cable bracket 100, 200, 300 may have a plurality of different sized cable securing areas 120, 220, 320 formed by having some arms 106, 206, 306 and plates 104, 204, 304 being of different lengths. A cable securing area 120, 220, 320 of a particular size may support securing a particular range of cable shapes and sizes. Having different sized cable securing areas 120, 220, 320 may therefore be beneficial to cover different ranges of cable sizes and shapes, for example.

Although the above examples have distinguished between the arm 106, 206, 306 and the fixed plates 104, 204, 306 that together form a cable securing area 120, 220, 320, this was for convenience of description. It is to be understood that a single integral length of material may act as both a plate 104, 204, 306 and an arm 106, 206, 306 extending therefrom. For example, as illustrated in FIG. 1, many of the plates 104 turn into arms 106 at their ends and then curve downward toward the base of adjacent plates 104. Likewise, although it is beneficial in many embodiments to have the plates 104, 204, 304 extend off the base 102, 202, 302 substantially perpendicular to the base 102, 202, 302 and parallel to one another, this is not a requirement and, in some embodiments, different cable securing areas 120, 220, 320 are formed with plates 104, 204, 304 that are not perpendicular to the base 102, 202, 302 and/or or not parallel to other plates 104, 204, 304. Furthermore, although ridges 114, 214, 314 are utilized to form the gripping surface for holding cables and wires securely in the above examples, other types of gripping surfaces may be employed using any kind of protrusion such as nubs or rippled surfaces. Friction tape or adhesive surfaces (e.g., 3M™ high friction tape) may also applied to the gripping surfaces of the plates 104, 204, 304 and/or arms 106, 206, 306 in other embodiments to help secure the cables.

Figure 24:
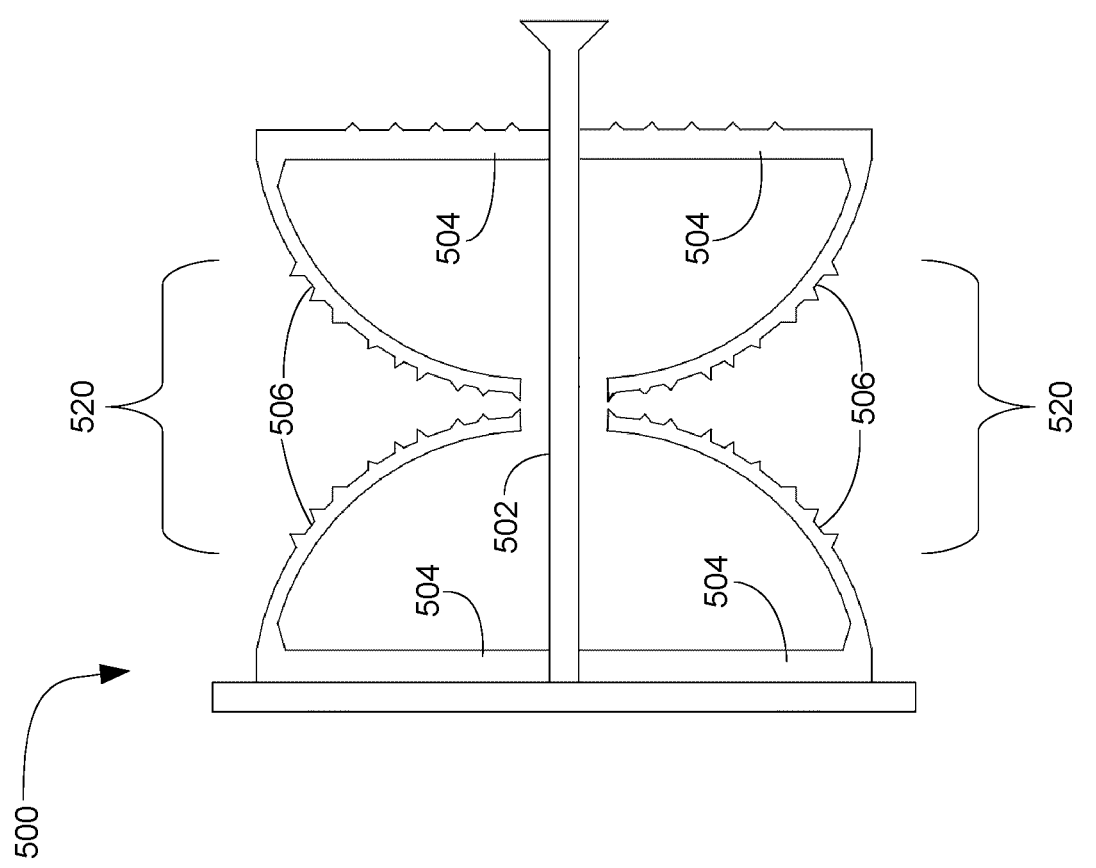
FIG. 24 shows a cable bracket having a cable securing area formed by two arms curving toward one another according to an exemplary embodiment.

Instead of a single flexible arm 106, 206, 306 curved toward an adjacent plate 104, 204, 304 to form a cable securing area as illustrated and described in the above embodiments, in other embodiments, a cable securing area 120, 220, 320 may be formed by two arms 106, 206, 306 curving toward one another. For instance, FIG. 24 shows a dual-side cable bracket 500 having two perpendicular plates 504 extending from both sides of the base 502. Each of the plates 504 has an arm 506 coming off the upper end and the arms 506 curve downward toward the base and meet in the middle between the adjacent plates 504. Two cable securing areas 520 are formed, each securing area 520 being between adjacent arms 506.

Although the above examples have focused on cable brackets 100, 200, 300, 500 for securing cables in buildings with wood framing members, brackets 100, 200, 300, 500 of similar structure may also support any desired framing member material. For instance, the various mounting plates 108 and screw holes 112 may be modified as required in any desired manner in order to secure the cable mounting bracket to the framing member made of any material. The mounting plate 108 may be modified in other embodiments to comprise a clip-based mounting system such as illustrated in U.S. Pat. No. 5,188,318 thereby allowing the bracket 100, 200, 300, 500 to be secured to a framing member such as a stud without requiring screws or other mounting hardware to penetrate the framing member.

Although curved arms 106, 206, 306, 506 are beneficial to provide a convex gripping surface to securely grip cables 150, 152, 154 because, after being flexed, the arm 106, 206, 306, 506 tends to approach a parallel line with the adjacent plate 104, 204, 304 (or adjacent arm 506) at the gripping point with the cable 150, 152, 154; the amount of the curve may be varied in other embodiments and non-curved arms 106, 206, 306, 506 such as straight arms or arms that approximate curves by including a plurality of straight sections at angles to one another be employed in other embodiments. For instance, in some embodiments, an arm 106, 206, 306, 506 may be a staircase shape or a curved shape approximated with straight line sections rather than a true curve.

Functions of single parts and components described above may be separated into multiple units, or the functions of multiple units may be combined into a single part or component. All combinations and permutations of the above described features and embodiments may be utilized in conjunction with the invention.

What is claimed is:

1. A cable bracket comprising:
   a base;

a first plate extending from a first side of the base;
a second plate extending from the first side the base, the second plate being adjacent to the first plate;
an arm extending diagonally from an upper end connected to the first plate at a position on the first plate away from the base, the arm extending from the upper end to a lower end positioned toward the base intermediate the first plate and the second plate; and
an attachment means at an end of the base for attaching the cable bracket to an external device having a compatible attachment means;
wherein the lower end of the arm is not secured to the base and is not secured to the second plate;
the arm is made of a semi-rigid material such that the arm is capable of being deflected from a neutral position by a user in order to insert a cable between the arm and the second plate;
forces exerted by the arm attempting to return to the neutral position hold the cable between the arm and the second plate; and
the external device is a slider support intermediate the cable bracket and a second cable bracket.

2. The cable bracket of claim 1, wherein the first plate and the second plate each extend from the base perpendicular to the base and parallel to one another.

3. The cable bracket of claim 1, wherein the arm is curved to form a convex gripping surface on a side of the arm facing the second plate.

4. The cable bracket of claim 1, further comprising a plurality of first protrusions extending from the arm toward the second plate.

5. The cable bracket of claim 4, further comprising a plurality of second protrusions extending from the second plate toward the arm.

6. The cable bracket of claim 5, wherein the first protrusions and the second protrusions comprise ridges.

7. The cable bracket of claim 5, wherein the first protrusions and the second protrusions comprise nubs.

8. The cable bracket of claim 1, further comprising a first adhesive layer securing a first friction surface to a gripping side of the arm facing toward the second plate.

9. The cable bracket of claim 1, further comprising a second adhesive layer securing a second friction surface to a gripping side of the second plate facing toward the arm.

10. The cable bracket of claim 1, further comprising:
a third plate extending from the first side the base, the third plate being adjacent to the second plate; and
a second arm extending diagonally from an upper end connected to the second plate at a position on the second plate away from the base, the second arm extending from the upper end to a lower end positioned toward the base intermediate the second plate and the third plate;
wherein the lower end of the second arm is not secured to the base and is not secured to the third plate;
the second arm is made of the semi-rigid material such that the second arm is capable of being deflected from a neutral position by the user in order to insert a second cable between the second arm and the third plate; and
forces exerted by the second arm attempting to return to the neutral position hold the second cable between the second arm and the third plate.

11. The cable bracket of claim 1, further comprising screw holes on the base for securing the base to a surface.

12. The cable bracket of claim 1, further comprising:
a fourth plate extending from a second side of the base, the second side being opposite the first side;
a fifth plate extending from the second side the base, the fifth plate being adjacent to the fourth plate; and
a third arm extending diagonally from an upper end connected to the fourth plate at a position on the fourth plate away from the base, the third arm extending from the upper end to a lower end positioned toward the base intermediate the fourth plate and the fifth plate;
wherein the lower end of the third arm is not secured to the base and is not secured to the fifth plate;
the third arm is made of the semi-rigid material such that the third arm is capable of being deflected from a neutral position by the user in order to insert a third cable between the third arm and the fifth plate; and
forces exerted by the third arm attempting to return to the neutral position hold the third cable between the third arm and the fifth plate.

13. The cable bracket of claim 1, further comprising a mounting plate perpendicular to the base and located at one end of the base.

14. The cable bracket of claim 13, further comprising screw holes on the mounting plate for securing the mounting plate to an external surface.

15. The cable bracket of claim 13, wherein the mounting plate extends at least thirty-two millimeters past a maximum length of the first and second plates from the base.

16. The cable bracket of claim 1, wherein the attachment means comprises a dovetail or a dovetail slot.

17. The cable bracket of claim 1, wherein the slider support has a length adjustable by the user.

18. The cable bracket of claim 1, wherein the slider support has an inner sliding rail which slides along a grove slot within an outer sliding housing in order to change a distance that the cable bracket is from the second cable bracket.

19. The cable bracket of claim 1, wherein the slider support includes:
a first end having a first dovetail slot adapted to mate with a dovetail of the first cable bracket; and
a second end having a second dovetail slot adapted to mate with a dovetail of the second cable bracket.

20. A method of utilizing the cable bracket of claim 1, the method comprising:
mounting the cable bracket on a first framing member;
mounting the second cable bracket opposite the cable bracket on a second framing member, wherein the second framing member is adjacent the first framing member; and
installing the slider support between the cable bracket and the second cable bracket;
whereby downward drooping or bending forces experienced by one of the cable bracket and the second cable bracket are countered by an other one of the cable bracket and the second cable bracket through the slider support.

* * * * *